(12) United States Patent
Koo et al.

(10) Patent No.: US 8,942,484 B2
(45) Date of Patent: Jan. 27, 2015

(54) TEXT DETECTION USING IMAGE REGIONS

(75) Inventors: Hyung-Il Koo, Seoul (KR); Kisun You, Suwon (KR)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/412,853

(22) Filed: Mar. 6, 2012

(65) Prior Publication Data

US 2013/0058575 A1    Mar. 7, 2013

Related U.S. Application Data

(60) Provisional application No. 61/531,547, filed on Sep. 6, 2011, provisional application No. 61/543,548, filed on Oct. 5, 2011.

(51) Int. Cl.
| | |
|---|---|
| G06K 9/00 | (2006.01) |
| G06K 9/32 | (2006.01) |
| G06K 9/46 | (2006.01) |

(52) U.S. Cl.
CPC ............ *G06K 9/3258* (2013.01); *G06K 9/3275* (2013.01); *G06K 9/4652* (2013.01)
USPC ............................. 382/198; 382/181; 382/298

(58) Field of Classification Search
USPC .......................................... 382/181, 198, 298
See application file for complete search history.

(56) References Cited

U.S. PATENT DOCUMENTS

| | | | | |
|---|---|---|---|---|
| 5,442,715 | A * | 8/1995 | Gaborski et al. | 382/187 |
| 5,828,782 | A * | 10/1998 | Sunakawa et al. | 382/173 |
| 6,226,396 | B1 * | 5/2001 | Marugame | 382/154 |
| 6,535,619 | B1 | 3/2003 | Suwa et al. | |
| 7,542,610 | B2 | 6/2009 | Gokturk et al. | |
| 8,031,940 | B2 | 10/2011 | Vincent et al. | |
| 8,300,934 | B2 * | 10/2012 | Yu et al. | 382/168 |
| 2002/0021840 | A1 * | 2/2002 | Ohara et al. | 382/199 |
| 2002/0154817 | A1 | 10/2002 | Katsuyama et al. | |
| 2003/0142106 | A1 * | 7/2003 | Saund et al. | 345/582 |
| 2003/0164819 | A1 * | 9/2003 | Waibel | 345/173 |
| 2011/0081083 | A1 | 4/2011 | Lee et al. | |
| 2011/0158532 | A1 | 6/2011 | Chung et al. | |

FOREIGN PATENT DOCUMENTS

JP            10021332 A      1/1998

OTHER PUBLICATIONS

International Search Report and Written Opinion—PCT/US2012/048974—ISA/EPO—Jan. 18, 2013.

Mancas-Thillou, et al., "Color Text Extraction with Selective Metric-Baesd Clustering", ScienceDirect—Computer Vision and Image Understanding, vol. 107, Jun. 2007, pp. 97-107.

Fu, et al., "A Robust Text Segmentation Approach in Complex Background Based on Multiple Constraints", Advances in Multimedia Information Processing—PCM 2005, Proceedings from the 6th Pacific-Rim Conference on Multimedia, 2005, pp. 594-605.

Jung, et al., "Text Information Extraction in Images and Video: A Survey", The Journal of the Pattern Recognition Society, vol. 37, No. 5., May 2004, pp. 977-997.

(Continued)

*Primary Examiner* — Alex Liew
(74) *Attorney, Agent, or Firm* — Toler Law Group, PC

(57) ABSTRACT

A method includes receiving an indication of a set of image regions identified in image data. The method further includes, selecting image regions from the set of image regions for text extraction at least partially based on image region stability.

20 Claims, 26 Drawing Sheets

(56) References Cited

OTHER PUBLICATIONS

Berclaz, et al., "Image-Based Mobile Service: Automatic Text Extraction and Translation", Proceedings of the SPIE—The International Society for Optical Engineering, vol. 7542, 2010, 12 pages.

Myers, et al., "Rectification and Recognition of Text in 3-D Scenes", International Journal on Document Analysis and Recognition (IJDAR), vol. 7, No. 2-3, 2004, pp. 147-158.

Epshtein, et al., "Detecting Text in Natural Scenes with Stroke Width Transform", 2010 IEEE Conference on Computer Vision and Pattern Recognition (CVPR), 2010, pp. 2963-2970.

Partial International Search Report for PCT/US2012/048974 mailed Dec. 3, 2012, pp. 2.

Arai, et al., "Text Extraction from TV Commercial using Blob Extraction Method," International Journal of Research and Reviews in Computer Science (IJRRCS), vol. 2, No. 3, pp. 895-899, Jun. 2011, Information Science Department, Saga University, Japan.

Leon, et al., "Region-Based Caption Text Extraction," Technical University of Catalonia (UPC), Barcelona, Spain, Image Analysis for Multimedia Interactive Services (WIAMIS), 2010 11th International Workshop, Apr. 12-14, 2010.

Koo, et al., "State Estimation in a Document Image and its Application in Text Block Identification and Text Line Extraction", ECCV Proceeding of the 11th European Conference on Computer Vision, 2010, 14 pp.

\* cited by examiner

TEXT DETECTION USING IMAGE REGIONS

I. CROSS-REFERENCE TO RELATED APPLICATIONS

The present application claims priority from U.S. Provisional Patent Application No. 61/531,547 filed Sep. 6, 2011 and U.S. Provisional Patent Application No. 61/543,548 filed Oct. 5, 2011, each of which is incorporated by reference in its entirety.

II. FIELD

The present disclosure is generally related to image processing.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Text detection may be performed by a computing device to identify text in an image that has been captured by a camera of the device. Conventional text detection may explicitly or implicitly require a color of text in an image to differ from a background color of the image. Such conventional text detection may fail to reliably detect text having substantially the same color as the background of an image. Alternatively, color segmentation methods can be used for text detection. Color segmentation may enable text detection of text having substantially the same color as an image background. However, color segmentation tends to be computationally demanding for personal computer-based implementations and may be unsuitable for portable electronic devices such as wireless telephones.

After a binarization process is performed to generate a binary image that contrasts the detected text portions of an input image with non-text portions of the input image, projection profile analysis may be applied to the binary image to estimate a skew of a text line (e.g. an angle the text line deviates from horizontal) and/or to estimate a tilt of text (e.g. an angle that text is tilted, such as italicized text). Compensation for tilt and skew enables more robust character recognition of the text. However, accurate projection profile analysis of text in binary images may also be computationally demanding and may be unsuitable for portable electronic devices.

IV. SUMMARY

Blob-based text extraction includes locating text blobs in an image as blobs that are stable, curvilinear, and non-overlapping. Blob abstraction may be performed prior to projection profile analysis to reduce a computational load of the projection profile analysis. Tilt and skew of text can be compensated based on the projection profile analysis for subsequent character recognition processing.

In a particular embodiment, a method includes receiving an indication of a set of image regions identified in image data and selecting image regions from the set of image regions for text extraction at least partially based on image region stability. In some embodiments, the image regions may be selected further based at partially on image region curvilinearity.

In another particular embodiment, an apparatus includes an image region extractor configured to generate an indication of a set of image regions identified in image data. The apparatus also includes a text image region selector configured to select image regions from the set of image regions for text extraction at least partially based on image region stability.

In another particular embodiment, a method includes identifying a geometric figure that corresponds to an image region. The image region corresponds to at least a portion of text identified in the image data. The method further includes determining a bounding box for the text based at least partially on the geometric figure.

In some embodiments, fitting error may be utilized. For example, in response to a first fitting error of the first geometric figure with respect to the image region exceeding a threshold, the method may include identifying a plurality of geometric figures that corresponds to the image region.

In some embodiments, projection profile analysis may be utilized. For example, the method may include determining a projection profile of the geometric figure using multiple projection lines. A value of the projection profile may correspond to each particular projection line and may be based on a distance between intersections of the particular projection line with geometric figure.

In another particular embodiment, the method may include identifying a plurality of geometric figures that corresponds to image regions, each of the image regions corresponding to at least a portion of the text. A first projection profile of the plurality of geometric figures may be determined to estimate a skew of the text. A second projection profile of the plurality of geometric figures may be determined to estimate a tilt of the text.

In another particular embodiment, the method may include extracting image regions from a set of image regions, each of the image regions corresponding to at least a portion of the text. The method may further include partitioning the extracted image regions into multiple clusters and determining a projection profile of each cluster independent of each of the other clusters.

In another particular embodiment, the method may include performing a first projection profile analysis on a first set of geometric figures that correspond to image regions identified in the image data. The first projection profile analysis may partition the first set of geometric figures into a second set of geometric figures and a third set of geometric figures. The method may further include performing a second projection profile analysis on the second set of geometric figures. The second projection profile analysis may partition the second set of geometric figures into a fourth set of geometric figures and a fifth set of geometric figures.

Particular advantages provided by at least one of the disclosed embodiments include the ability to recognize text within an image without requiring the text color to differ from the background color, as compared to conventional binarization techniques that typically require text color to differ from background color, and with reduced computational demand as compared to color segmentation techniques.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
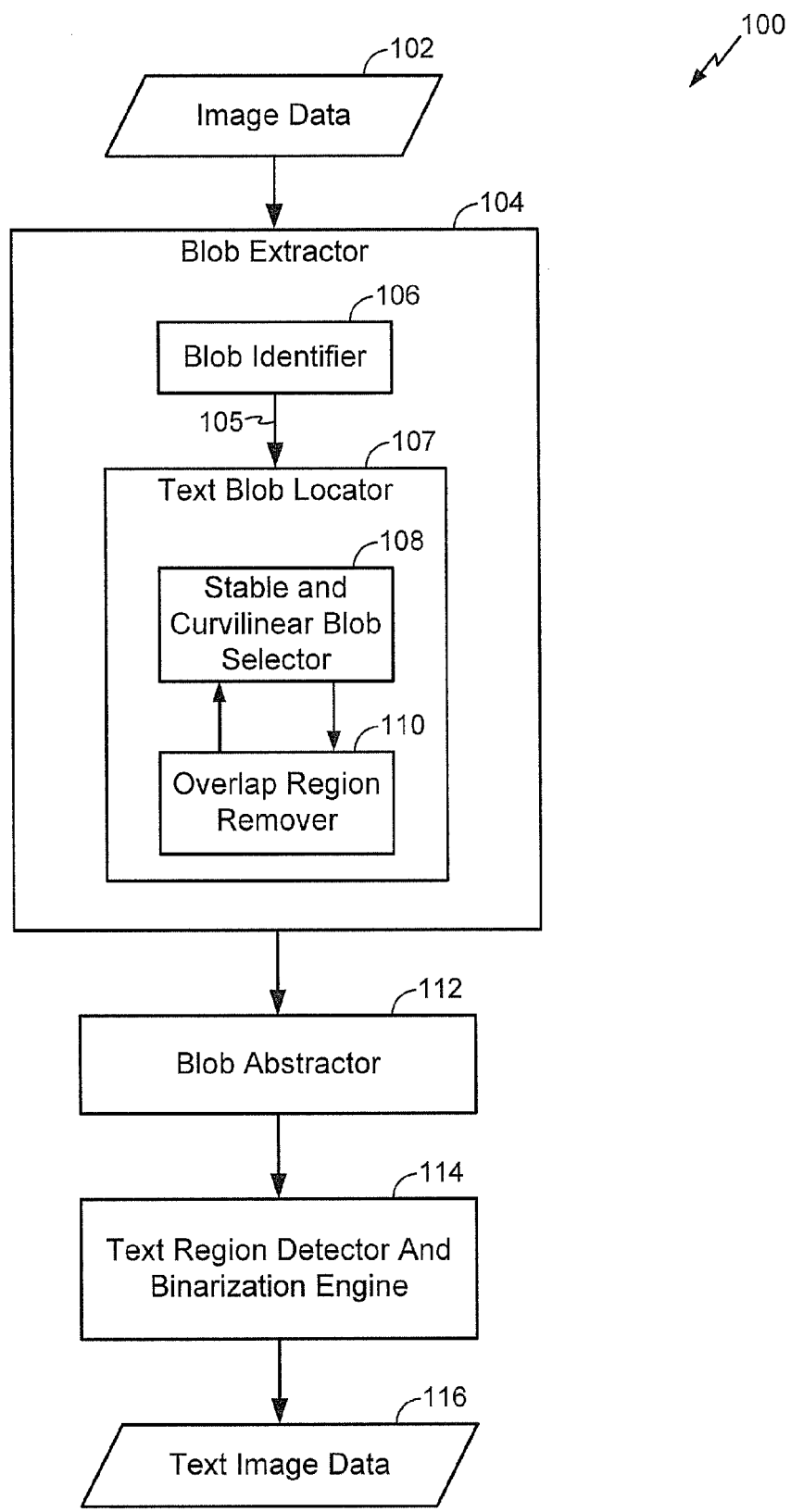
FIG. 1 is a block diagram of a particular embodiment of a system to provide text detection.

Referring to FIG. 1, a particular embodiment of a system 100 that includes text detection based on image regions (e.g. blob extraction) is illustrated. The system 100 includes a text blob extractor 104 coupled to a blob abstractor 112. The blob abstractor 112 is coupled to a text region detector and binarization engine 114. The text blob extractor 104 is configured to receive image data 102 and to identify blobs at a blob extractor 106. A "blob" is a substantially homogenous region of the image data 102. For example, the blob extractor 106 may be configured to scan the image data 102 and to identify regions of the image data 102 having substantially unchanging pixel color values or intensity. To illustrate, a region of an image color space may be identified and as a set of contiguous pixels having pixel values within the identified color space may be identified as a blob. The blob extractor 106 may be a "general" blob extractor that is configured to identify blobs in image data without being specifically configured to detect whether any blobs are text candidates or non-text candidates. An indication 105 of blobs that are identified by the blob extractor 106 may be provided to a text blob selector 107. For example, the indication 105 may include a list of identified blobs, such as an index of each identified blob and a list of pixels of the image data 102 that correspond to each identified blob. As another example, the indication 105 may include a list or array of pointers to blob pixel data. As another example, the indication 105 may include the image data 102 or a subset of the image data 102 and may indicate, for each pixel, each blob (if any) to which the pixel belongs.

In a particular embodiment, the text blob selector 107 includes a stable and curvilinear blob selector 108 and an overlap region remover 110. The text blob selector 107 may be configured to receive the indication 105 of blobs identified by the blob extractor 106 and to select a set of blobs that are stable and curvilinear. For example, stability of a blob may indicate that a size of the blob does not change substantially with changes in a threshold value. To illustrate, the threshold value may correspond to a boundary of a region in an image color space, and small changes in the boundary of the color space region may cause relatively small changes in size for a stable blob, while unstable blobs may change size significantly in response to small changes in color space region boundaries. Upon locating one or more stable blobs, the stable and curvilinear blob selector 108 may be configured to determine whether an identified stable blob is also curvilinear. As used herein, "curvilinear" corresponds to having a stroke width that is small compared to a size of the blob. For example, a blob including the letter "s" may have a size corresponding to an outer dimension of the letter "s," and may have a stroke width, corresponding to a thickness of a cross-section of the letter. Because text tends to be curvilinear (e.g. letters and characters tend to be formed of lines and curves that may be made by a pen or other writing instrument), blobs that are not curvilinear may be rejected as text candidates. The stable and curvilinear blob selector 108, upon identifying a blob that satisfies a requirement for stability and that further satisfies a requirement for curvilinearity, may provide an indication of the identified blob to the overlap region remover 110.

The overlap region remover 110 may remove blobs that were identified by the blob extractor 106 and that overlap a particular stable and curvilinear blob selected by the stable and curvilinear blob selector 108. To illustrate, the blob extractor 106 may identify multiple blobs within a single region of an image that may overlap each other. Because overlapping blobs may introduce ambiguity in text detection, once a stable and curvilinear blob is identified that may correspond to a recognized letter or to other text, the overlap region remover 110 locates and removes all other blobs overlapping the identified stable and curvilinear blob. It may be assumed that letters or other text appearing in the image data 102 do not overlap each other. Therefore, once a blob is selected as satisfying criteria for letters or text, any blobs overlapping the selected blob may be removed. After overlapping blobs have been removed by the overlap region remover 110, the stable and curvilinear blob selector 108 may continue processing of remaining blobs of the set of blobs identified by the blob extractor 106 to identify additional blobs that meet stability and curvilinear requirements, until the text blob selector 107 has identified a set of blobs that are stable, curvilinear, and not overlapping. The text blob extractor 104 outputs this identified set of blobs as likely to correspond to text in the image data 102.

In a particular embodiment, the blob abstractor 112 is configured to perform one or more computations on the blobs received from the text blob extractor 104 and to perform analysis to assist operation at the text region detector and binarization engine 114. For example, as explained with respect to FIG. 8, the blob abstractor 112 may be configured to determine a set of geometric shapes corresponding to the identified blobs and to process the geometric shapes to determine a skew, tilt, or other effects that may affect text recognition for later optical character recognition (OCR) processing. For example, computation requirements may be significantly reduced by abstracting the identified blobs as geometric figures instead of as sets of pixels. Reduced computational requirements may enable text extraction to be performed on handheld devices or other devices that may have relatively limited processing resources as compared to desktop computing systems.

Figure 9:
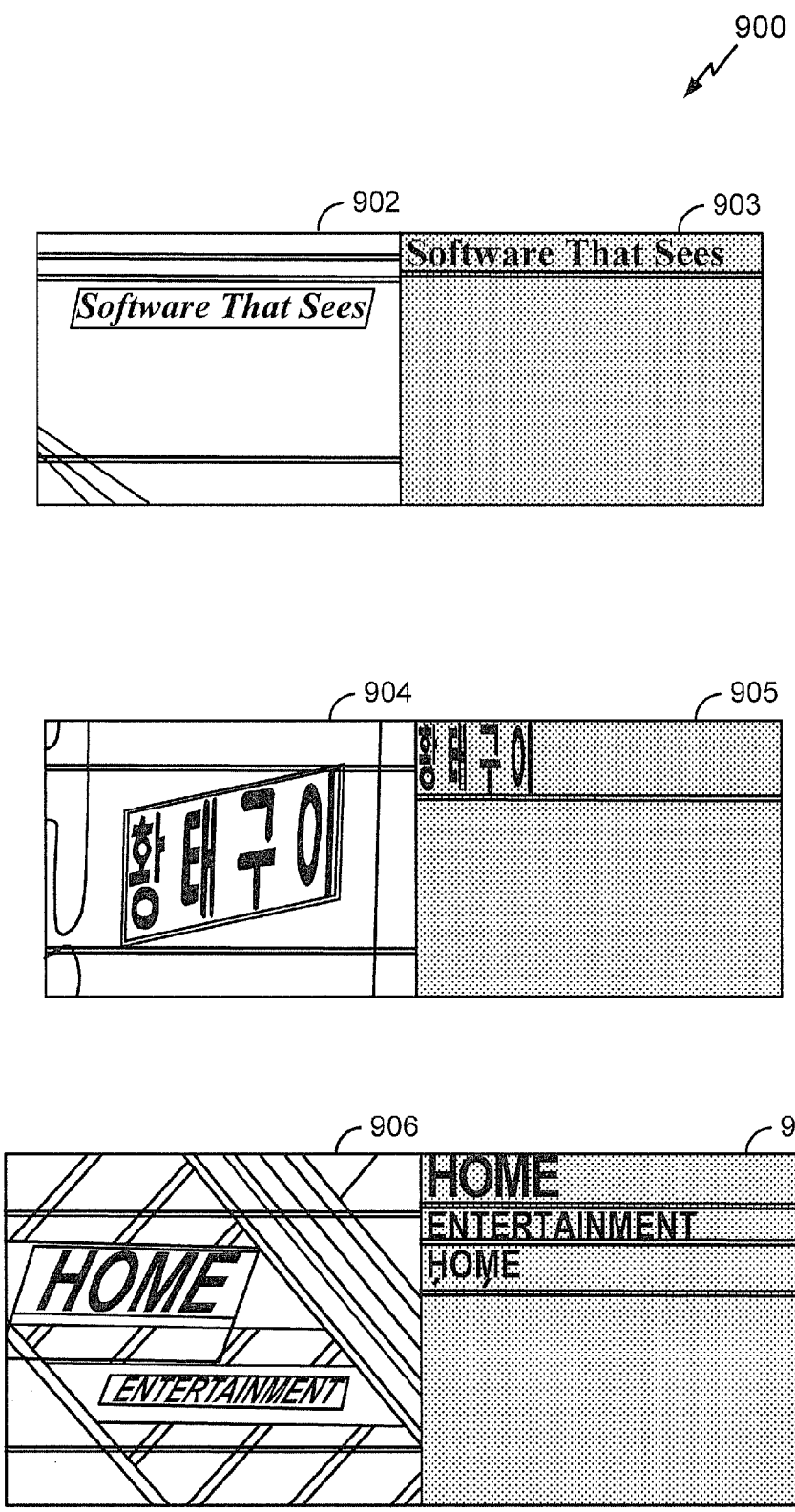
FIG. 9 illustrates examples of text effect compensation that may be performed by the system of FIG. 1.
Figure 10:
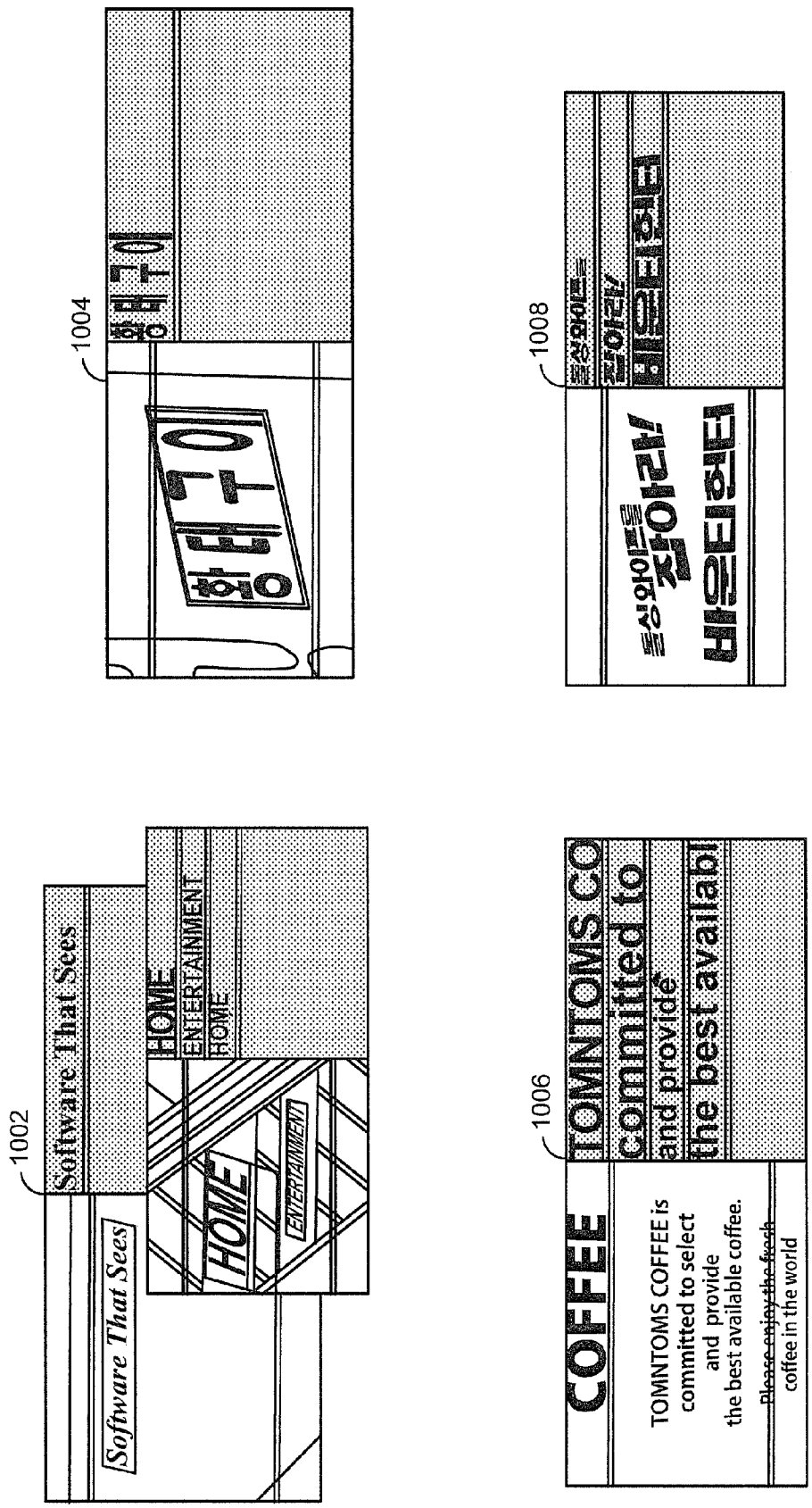
FIG. 10 illustrates additional examples of text effect compensation that may be performed by the system of FIG. 1.
Figure 11:
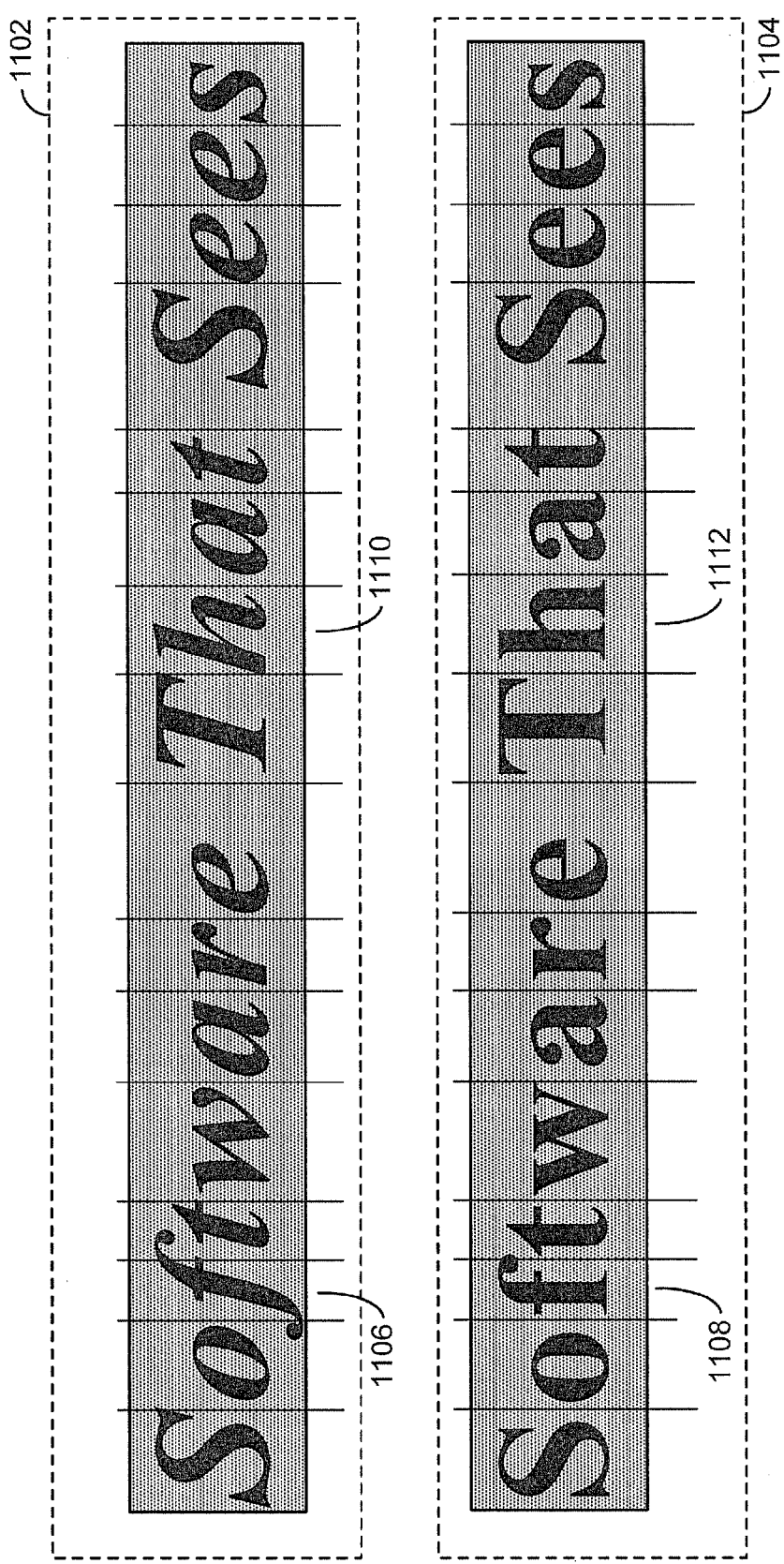
FIG. 11 is a diagram depicting an illustrative example of tilt compensation that may be performed by the system of FIG. 1.

The text region detector and binarization engine 114 is configured to receive an output from the blob extractor 112 and to perform text region detection and binarization. For example, the text region detector and binarization engine 114 may be configured to locate regions in the image data 102 corresponding to text and to generate a binary image with pixels corresponding to text regions having one value and pixels corresponding to non-text regions having another value, such as a black-and-white image having white text on a black background or black text on a white background. The text region detector and binarization engine 114 may generate text image data 116 that may include a binary image that contrasts detected text with non-text areas of the image. Examples of text image data are illustrated in FIGS. 9-11.

Figure 2:
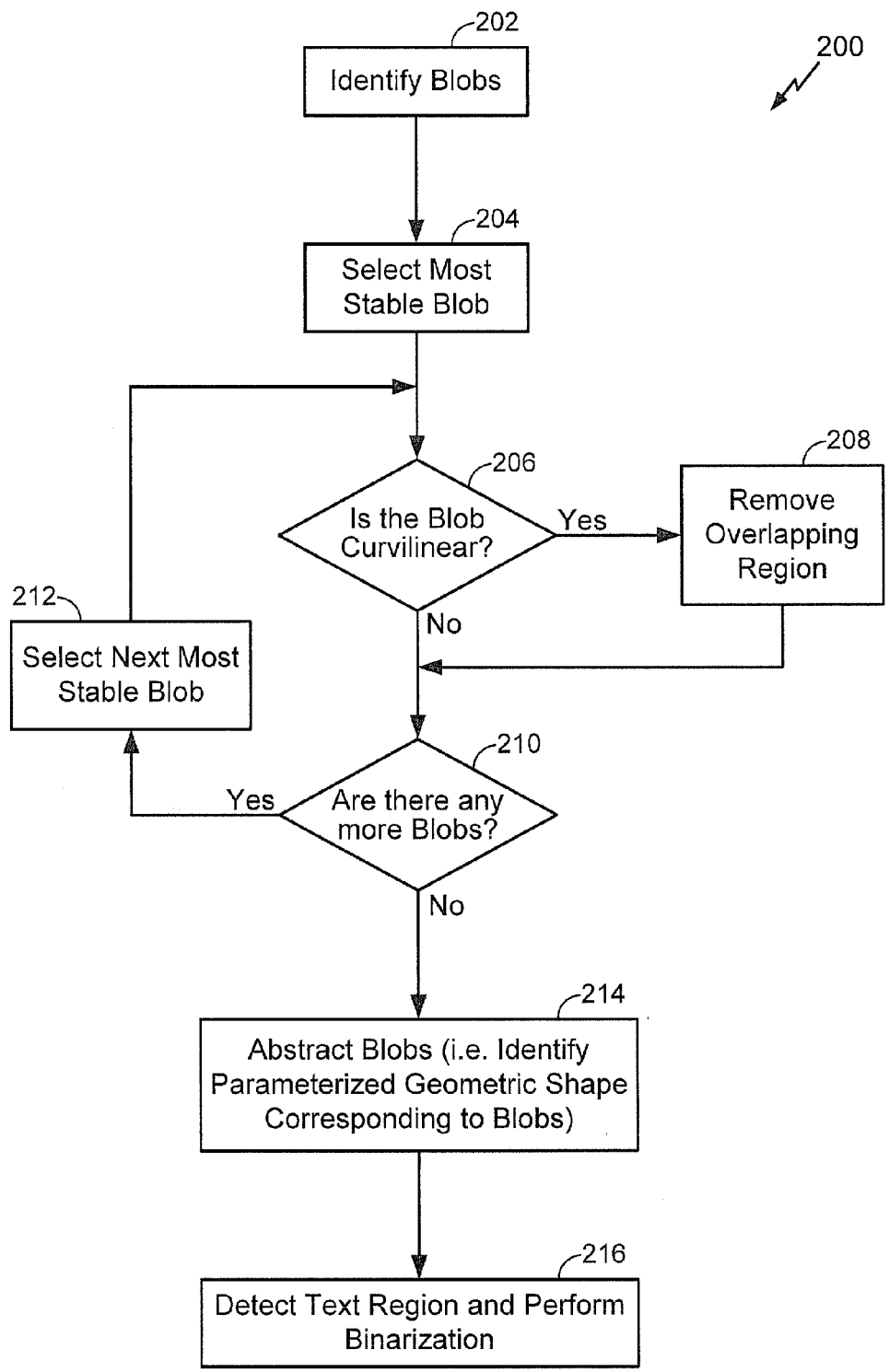
FIG. 2 is a flow diagram of a method of text detection that may be performed by the system of FIG. 1.

Referring to FIG. 2, a particular embodiment of a method of text recognition using blobs is depicted and generally designated 200. The method 200 may be performed at a blob-based image processing text engine, such as the system 100 of FIG. 1. The method 200 includes identifying blobs, at 202. For example, image data may be received and one or more tests or filters may be performed on the received image data to identify regions of the image that are substantially homogenous. To illustrate, one or more ranges of pixel values may be selected and sets of pixels may be identified as being in continuous regions and having values in the selected ranges. As another example, a particular pixel may be identified and other pixels adjacent to the identified pixel having pixel values within a predefined range of the pixel values of the identified pixel may be located. In this manner, regions of the image that have substantially homogenous pixel values or color space values may be identified as blobs.

Figure 4:
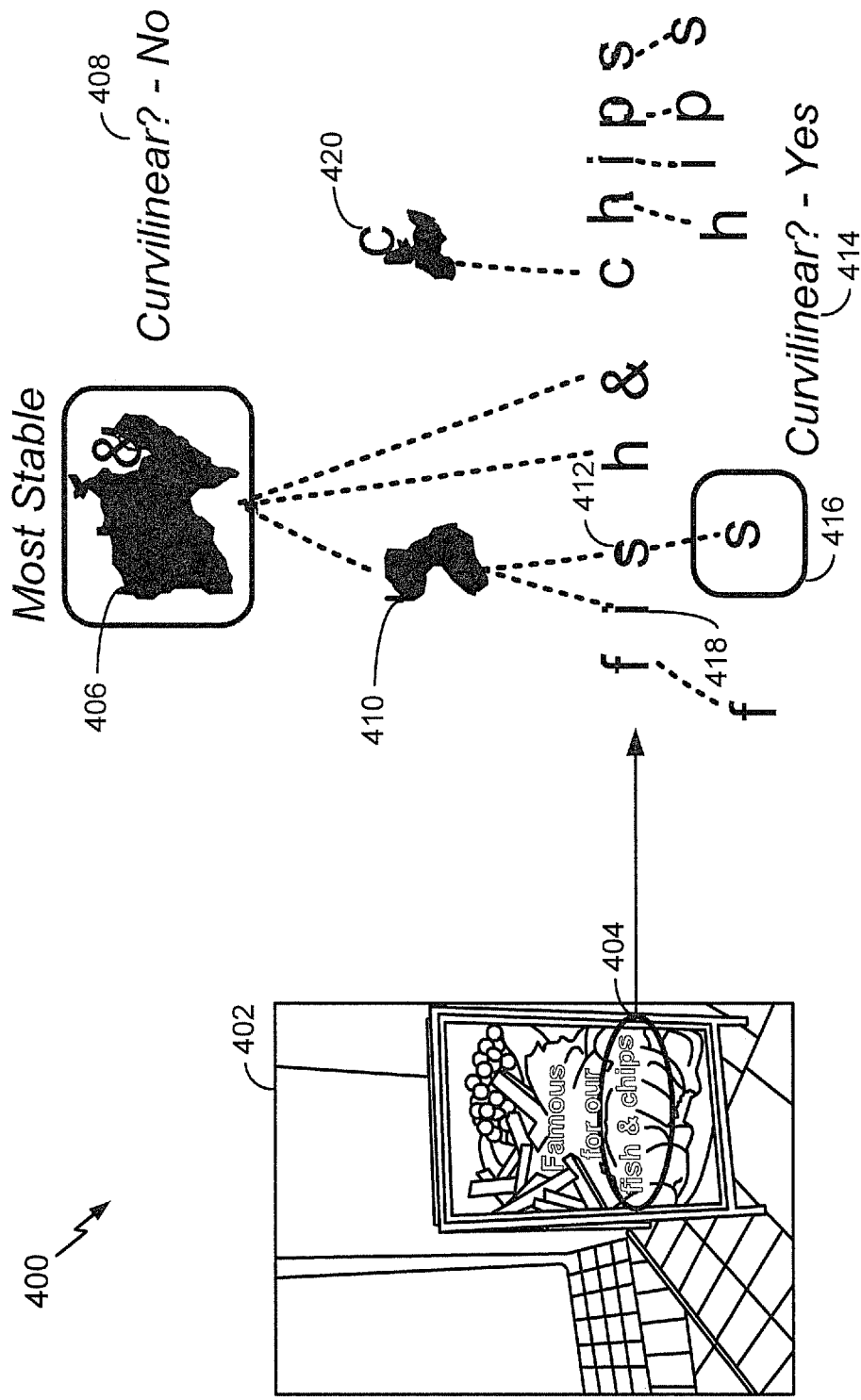
FIG. 4 is a diagram depicting an illustrative example of blob extraction that may be performed by the system of FIG. 1.

The identified blobs are processed to identify test candidates in a processing loop at 204-212 (a further example is depicted with respect to FIG. 4). A most stable blob of the identified blobs is selected, at 204. For example, each of the blobs may be processed to determine particular stability value for each blob. To illustrate, a process that may be similar to binarization may be performed multiple times with different thresholds. A change of blob size in response to the change of threshold for each of the identified blobs may be determined. For example, a degree of change or a derivative value of a size of a blob with respect to a change in threshold may be identified and used as a measure of stability. After identifying the most stable blob of the identified blobs, a determination is made whether the blob is curvilinear, at 206. For example, a stroke width of the blob may be compared to a size of the blob. An example of blob curvilinear determination is illustrated with respect to FIG. 14.

In response to determining that the identified blob is curvilinear, at 206, overlapping blobs are removed, at 208. For example, any blobs overlapping a region occupied by the curvilinear blob may be removed, at 208. As a result, ambiguity due to overlapping blobs in the identified set of blobs may be removed under the assumption that text does not overlap other text within the image. In response to determining that the blob is not curvilinear, at 206, or after removing overlapping blobs in the region of the identified curvilinear blob at 208, processing continues with a determination of whether there are any more identified blobs remaining to be processed, at 210. In response to determining that there are more blobs remaining to be processed, at 210, a next most stable blob is selected, at 212, and processing continues to determine whether the next most stable blob is curvilinear, at 206. Processing may continue until all of the blobs identified at 202 have been processed and either identified as stable curvilinear blobs or removed.

During processing, a blob may be removed from the set of identified blobs in response to determining that the blob is not curvilinear, at 206, or in response to determining that the blob overlaps another blob that is determined to be curvilinear, at 208. In other embodiments, a blob may be removed in response to determining the blob is not stable. When a determination is made that there are not any more blobs to be processed (e.g. every identified blob has either been determined to be curvilinear, at 206, or has been removed), at 210, the remaining blobs (i.e. the blobs that have not been removed) are abstracted, at 214. For example, parameterized geometric shapes corresponding to the blobs may be identified for additional image text processing, as described with respect to FIG. 8. After abstracting the remaining blobs, at 214, a text region is detected and one or more normalized binary images are generated, at 216. The detected text region and generation of normalized binary images may be performed based on the results of abstracting the remaining blobs. For example, normalization can include processing of image data to remove text effects including skew and tilt, as illustrative examples.

By performing text extraction by using blob identification and applying criteria to select blobs that are curvilinear and stable, the method 200 enables detection of character-type regions of an input image at substantially reduced processing complexity as compared to methods based on color segmentation. For example, color segmentation may require processing that is computationally demanding even for personal computer-based implementations. In addition, by performing blob extraction and blob abstraction, normalized binary images may be efficiently generated without explicitly or implicitly requiring that the image data have a single background color and a single text color that is different from the background color. Instead, text is identified based on homogenous regions of the image (whatever color the homogenous regions may be) that satisfy criteria of being non-overlapping, stable, and curvilinear. Examples of images in which text may be identified using the system 100 of FIG. 1 or by performing the method 200 of FIG. 2, are illustrated in FIG. 3.

Figure 3:
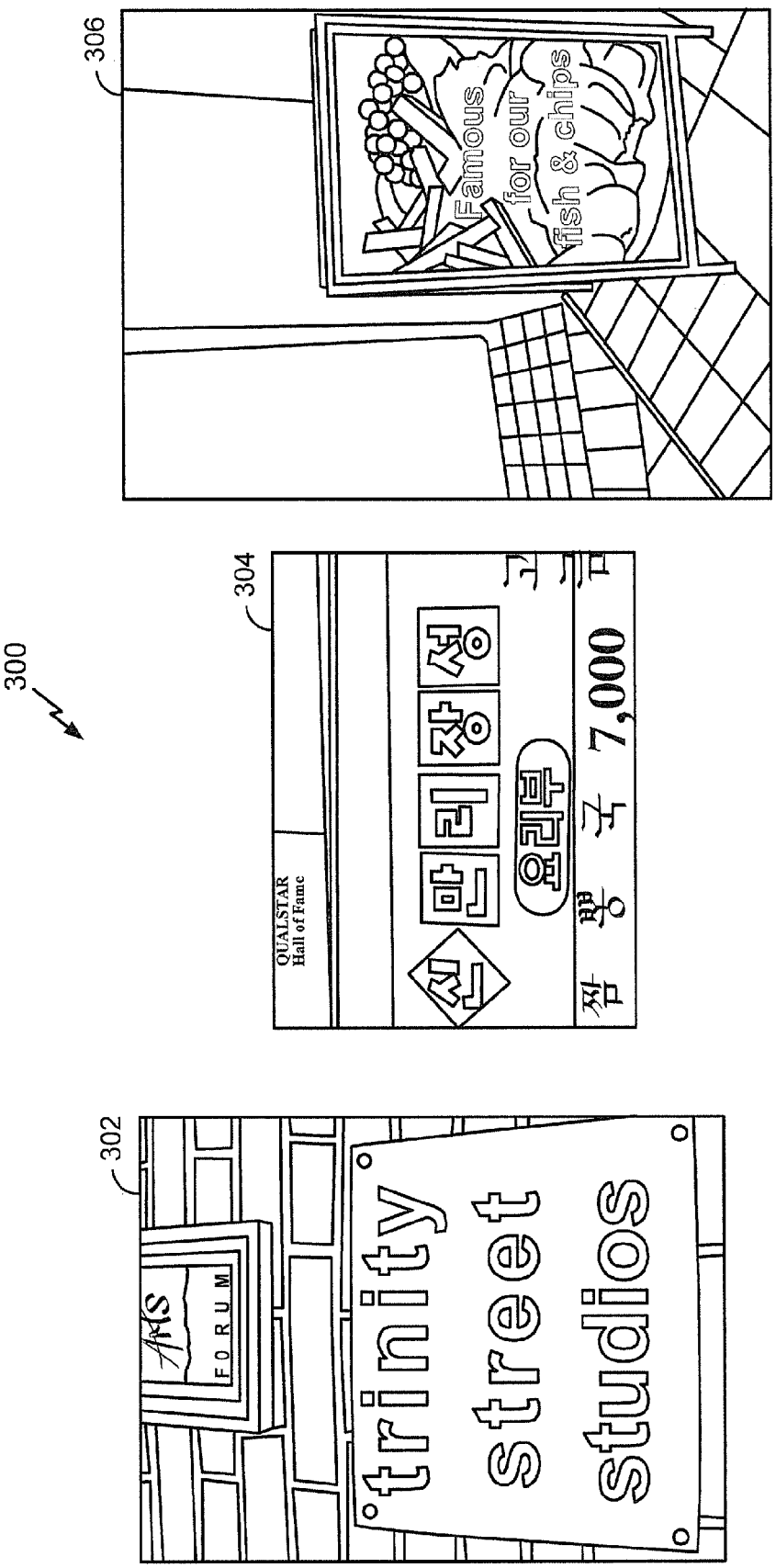
FIG. 3 illustrates examples of images including text that may be detected by the system of FIG. 1.

FIG. 3 illustrates images 302, 304, and 306 containing text that may be detectable using blob extraction. The image 302 includes text where the text color and the background color are the same. Binarization engines that are not based on blob extraction (such as color-based binarization) may fail to correctly identify the text in the first image 302 because the binarization engine may expect the text color to differ from the background color. However, blob extraction and abstraction described with respect to FIG. 1 and FIG. 2 may identify each of the letters as a homogenous region within a differently-colored border and may therefore correctly identify the text in the image 302.

The image 304 includes Asian character text that has a color substantially similar to an image background color and is bordered by differently-colored regions. Conventional text extraction engines may have difficulty in identifying the text characters sharing a common color with the image background and surrounded by large regions of differently colored pixels.

The image 306 includes a sign having white text superimposed over a background image that has a complex color scheme with many edges and various colors. Because the background of the text in the image 306 has multiple colors and is complex, and because the color of the text (for example the "ish" in the word "fish") is similar to portions of the background, conventional binarization and text extraction may be unable to distinguish the text. However, the blob-based method 200 of FIG. 2 enables identification of the text in the image 306, as illustrated with respect to FIG. 4.

Referring to FIG. 4, a general figure illustrating an application of the method 200 of FIG. 2 is illustrated and generally designated 400. An image 402, corresponding to the image 306 of FIG. 3, is examined for text extraction. During processing, a set of blobs may be identified and evaluated for stability. For example, processing of a region 404 of the image 402 may result in multiple blobs being identified. A blob 406 may be identified as a most stable of the identified blobs. The blob 406 corresponds to a large region of substantially similar color in the image 402. The blob 406 may be a largest of multiple overlapping blobs that encompass the letters "ish" and the "&" from the phrase, "fish & chips" in the image 402.

After identifying the blob 406 as a most stable blob of a set of identified blobs in the image 402 or in the region 404, a determination 408 is made whether the blob 406 is curvilinear. Because a stroke width of the blob 406 is large compared to a size of the blob 406 (as described in further detail with respect to FIG. 14), the blob 406 is determined to be not likely to correspond to text in the image 402.

A next most stable blob in the set of identified blobs is identified. For example, another blob 410 (that overlaps the blob 406) may be identified as a next most stable blob. The blob 410 is examined and is determined to not be curvilinear.

As a result, the blob 410 is removed from consideration. The blob 410 may be selected for curvilinear testing based on a stability of the blob 410 and independent of whether the blob 410 overlaps the previously-examined blob 406.

When another blob 412 is identified as a next most stable blob, the blob 412 is examined for curvilinearity. The blob 412 is determined to not satisfy constraints for curvilinearity, and is removed from consideration. When a blob 416 (that corresponds closely to the letter "s" in the word "fish") is identified as a next most stable blob, the blob 416 is tested for curvilinearity, and a determination 414 is made that the blob 416 is curvilinear. Because the blob 416 is a stable, curvilinear blob, the blob 416 may be likely to correspond to text and blobs overlapping the blob 416 are removed. Similarly, when a blob 418 (that corresponds to the letter "i") is identified as a next most stable blob and is determined to be curvilinear, blobs overlapping the blob 418 are removed from consideration.

A blob 420 may be identified as a next most stable blob. The blob 420 includes the letter "c" and also includes a portion of the image background having a substantially similar color as the letter "c." The blob 420 is identified as not being curvilinear, and is removed from consideration. The blob 420 overlaps a blob containing only the letter "c," which may be determined to be a next most stable blob and is determined to be curvilinear. As a result, the blob containing the letter "c" is retained as a candidate for text. In this manner, blob extraction using stability and curvilinear criteria may successfully identify the letters of the image 402 that overlap a similarly colored background, revealing blobs corresponding to text in the region 404.

Although the blob 406 is described as a most stable blob, and overlapping blobs 410, 412, and 416 are described as successive next most stable blobs, it should be understood that determination of blob stability may be independent of blob size and/or overlap. For example, blob 406 may be determined to be a most stable blob. After blob 406 is determined to not be curvilinear, blob 416 may be determined to be a next most stable blob. In this example, after determining that blob 416 is curvilinear, overlapping blobs 410 and 412 are removed from consideration due to overlapping the curvilinear blob 416 without testing whether either of blob 410 or 412 are curvilinear. As another example, blob 416 (rather than blob 406) may be determined to be a most stable blob. After blob 416 is determined to be curvilinear, blobs 406, 410, and 412 that overlap blob 416 are removed from consideration without determining whether any of the blobs 406, 410, and 410 are curvilinear.

Figure 5:
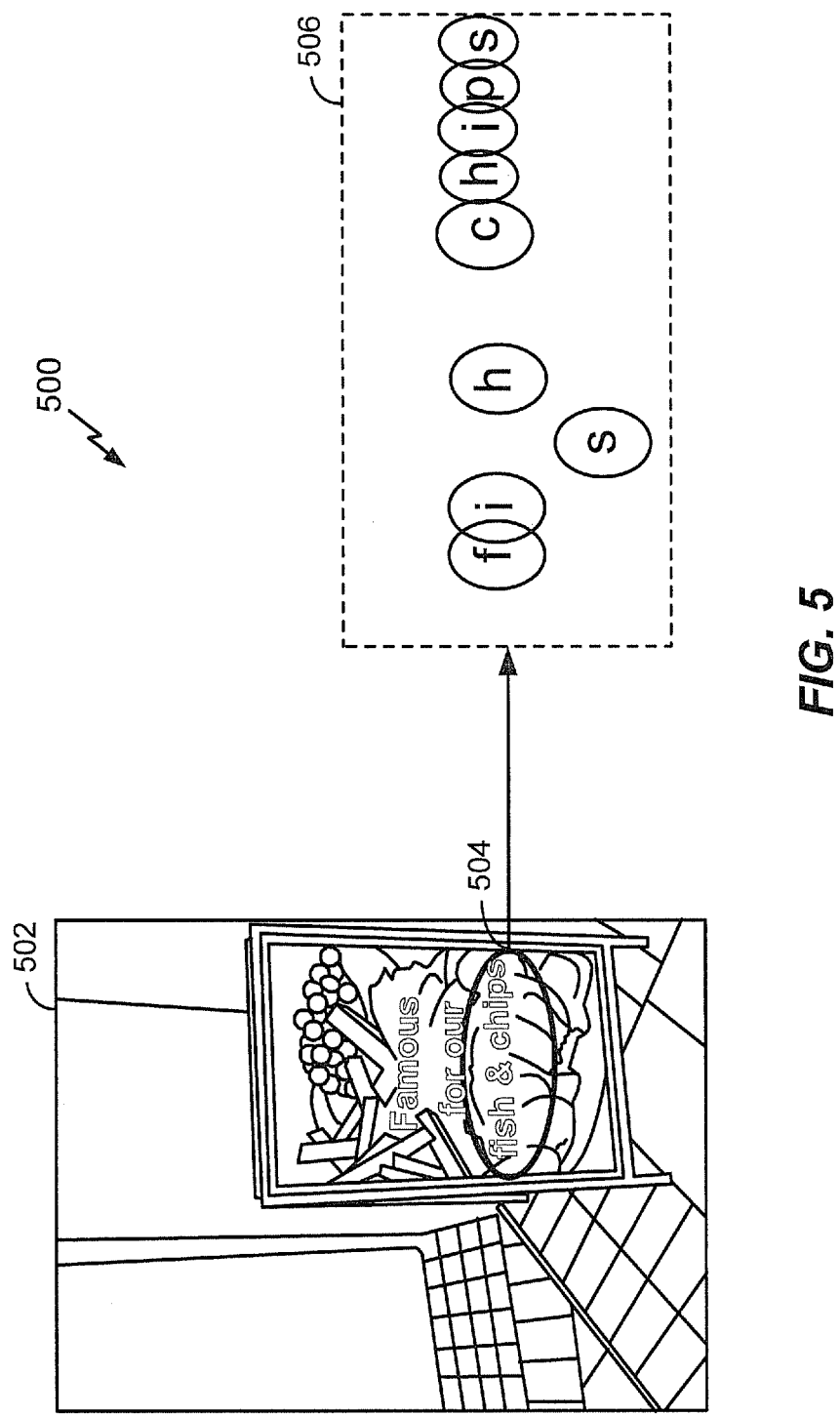
FIG. 5 is a diagram depicting an illustrative example of results of the blob extraction of FIG. 4.

Referring to FIG. 5, an image 502 that corresponds to the image 402 of FIG. 4 and results of performing blob extraction of an area of the image 504 according to the method 200 of FIG. 2 are illustrated. A set of blobs 506 correspond to sections of the image 502 that are stable, curvilinear, and non-overlapping. The set of blobs 506 may be presented to a blob abstractor for abstraction prior to performing text region detection and generating a normalized binary image, as described in further detail with respect to FIG. 8.

Figure 6:
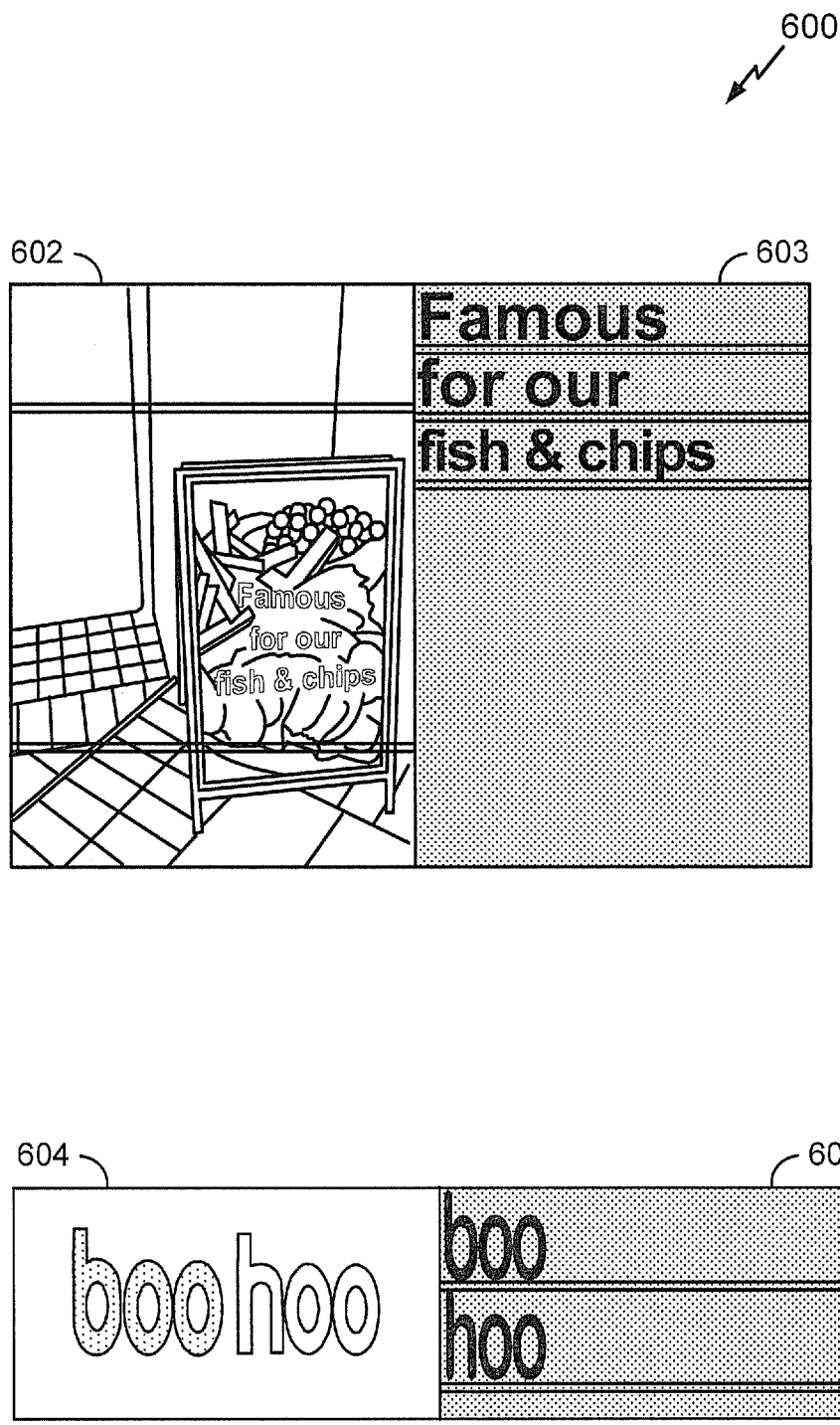
FIG. 6 illustrates examples of text image data that may be detected by the system of FIG. 1.

Referring to FIG. 6, an example 600 of blob-based text extraction includes a first image 602 and blob extraction/normalization results for the first image 602, illustrated as sets of blobs 603. The sets of blobs 603 illustrate that each of the letters present in the sign in the first image 602 have been identified according to blob extraction and application of the stability, curvilinearity, and non-overlapping criteria. The identified blobs have been normalized by removing text effects to generate the set of blobs 603

The example 600 further includes a second image 604 including a first set of letters "boo" having a different color than the background, and a second set of letters "hoo" having the same color as the background and having white borders delineating each letter. A blob extraction process as described with respect to FIGS. 1-5 may generate extracted blobs that may be normalized by removing text effects to generate sets of blobs 605. The sets of blobs 605 include a first set of blobs corresponding to the letters "boo" and a second set of blobs corresponding to the letters "hoo".

Figure 7:
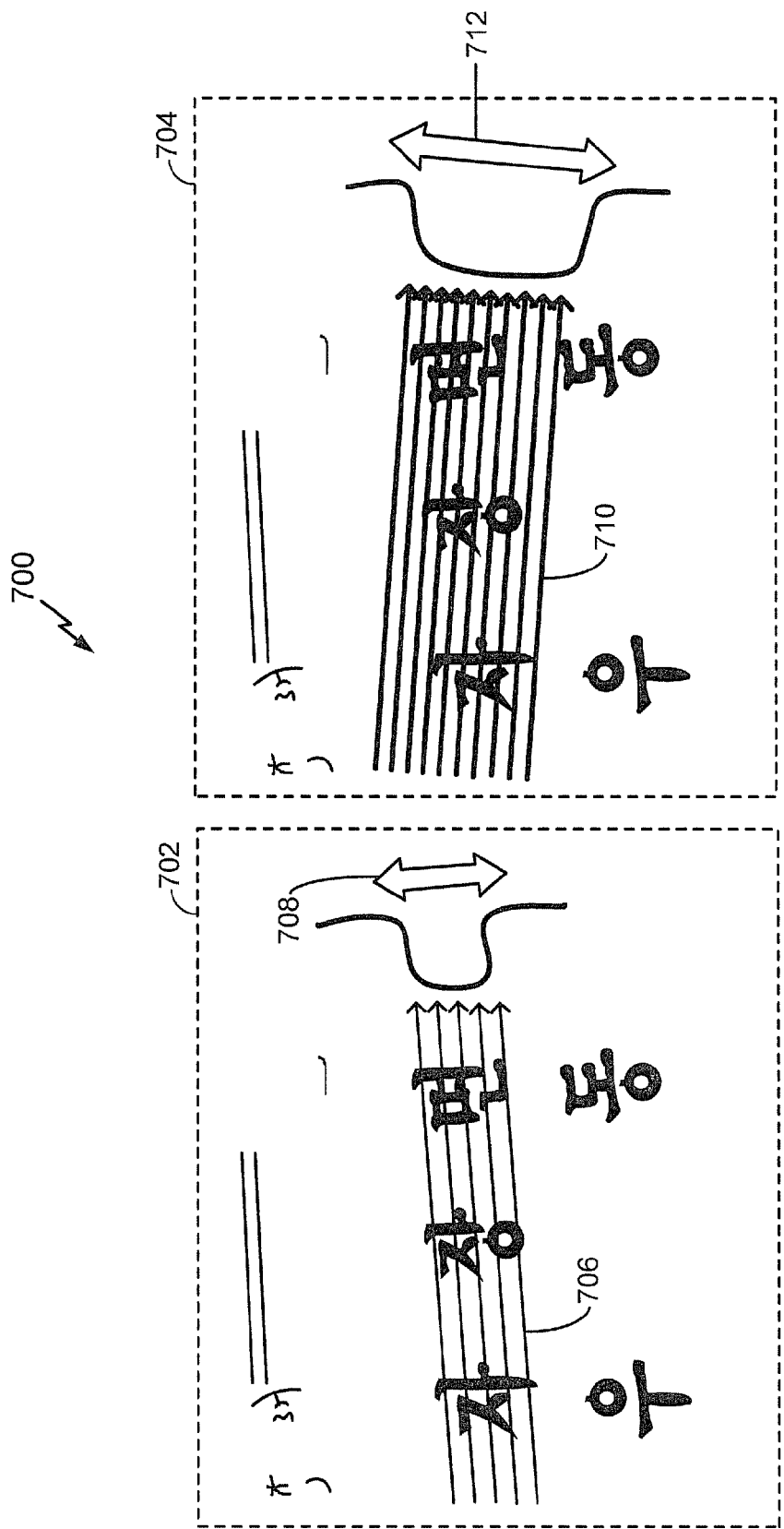
FIG. 7 is a diagram depicting an illustrative example of projection profile analysis that may be performed by the system of FIG. 1.

Referring to FIG. 7, examples of projection profile analysis are illustrated and generally designated 700. A first example 702 illustrates projection profile analysis using a first set of projection lines 706 following a first projection direction that cross a series of identified blobs and results in a projection profile 708 of a line of text. A second example 704 of projection profile analysis illustrates a second set of projection lines 710 following a second projection direction, resulting in a larger projection profile 712 of the line of text.

Projection profile analysis may be performed to the blobs that are identified by the text blob extractor 104 of FIG. 1 or as described with respect to a blob extraction portion of the method 200 of FIG. 2. Projection profile analysis may include selecting a number of directions (e.g. M directions) to be tested and may be performed on each pixel of a region of an image having a width W and a height H, resulting in an overall complexity to perform the projection profile analysis on order W×H×M. The projection profile analysis may include selecting the smallest determined projection profile (e.g. selecting the projection profile 708 as being smaller than the projection profile 712) and may include identifying a text skew as corresponding to an angle of the projection profile lines to a horizontal (i.e. the lines resulting in the smallest computed projection profile). Although the projection profile analysis illustrated in FIG. 7 may be performed on the extracted blobs as groups of pixels, a computational complexity to determine skew and tilt of text may be significantly reduced by performing blob abstraction prior to projection profile analysis, as explained in further detail with respect to FIG. 8.

Figure 8:
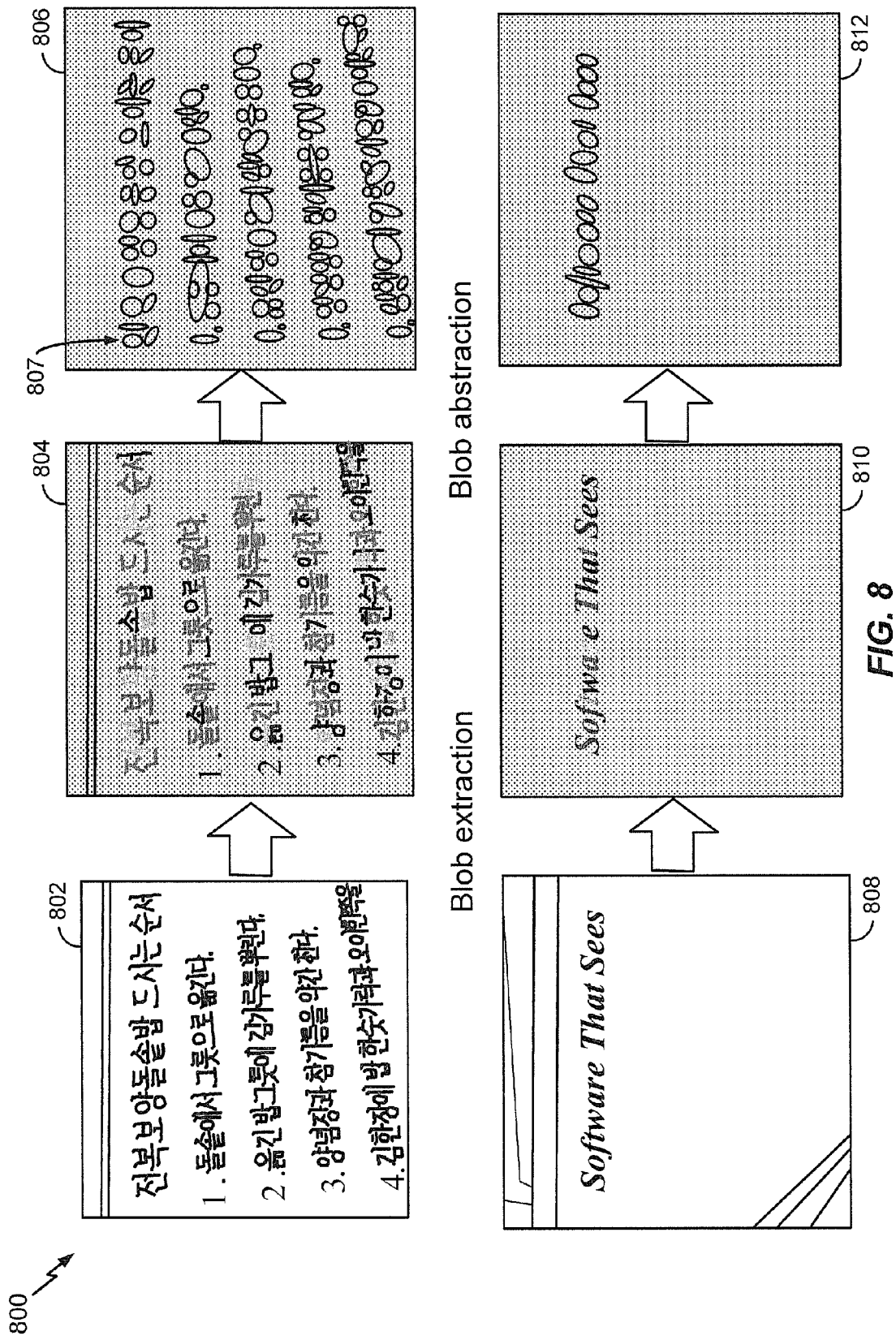
FIG. 8 is a diagram depicting illustrative examples of blob abstraction that may be performed by the system of FIG. 1.

Referring to FIG. 8, an example of blob abstraction is depicted and generally designated 800. An image 802 includes text with numerals and Korean characters. Blob extraction corresponding to the image 802 results in identification of blobs that are illustrated in an image 804. The image 804 illustrates extracted blobs as white pixels against a black background. The extracted blobs in the image 804 may be processed by a blob abstraction process to generate abstracted blobs in an image 806.

Blob abstraction may be performed by locating ellipses (or other shapes) that substantially cover or encompass each of the identified blobs. Parametric figures may be used, such as ellipses, triangles, rectangles, or other shapes that may be identified using a relatively few number of parameters, as a computationally inexpensive alternative to using the identified blobs as collections of individual pixels (and therefore having a number of parameters equal to a number of pixels in each blob). As illustrated in the blob abstraction result depicted in the image 806, each blob from the blob extraction has been fitted with an ellipse, such as a representative ellipse 807. The ellipse may be selected according to an energy minimization technique, a least squared error technique, or one or more other techniques to obtain a fit of the geometric shape to its corresponding blob so that the geometric shape generally corresponds to a same span and angle of inclination as the blob.

FIG. 8 includes a second example of an image 808 that includes text. A result of blob extraction is provided in an image 810 that includes blobs corresponding to the text in the image 808 and also including one or more other non-text blobs. A result of performing blob abstraction is depicted in an image 812. As illustrated, results of blob abstraction in the image 812 include a set of ellipses, each ellipse generally corresponding to a size of a corresponding blob and having an orientation (i.e. a long axis) substantially aligning with an orientation of its corresponding blob. Non-text blobs have been eliminated due to the corresponding ellipses for the non-text blobs failing to satisfy one or more minimum size thresholds.

After performing blob abstraction, projection profile analysis may be computationally simplified in one embodiment by performing the projection profile analysis using pixels enclosed within the identified geometric figures, such as the pixels within the ellipses illustrated in FIG. 8. In another embodiment, computational complexity may be more significantly reduced by determining projection values for each of the geometric figures according to equations describing the geometric figures. For example, computation to determine a projection value for an ellipse is relatively straight-forward, resulting in an overall projection profile analysis complexity of n×M, where n corresponds to the number of abstracted blobs (i.e. the number of ellipses), and where M corresponds to the number of text projection angles to be tested.

Computational cycles that may be saved by using blob abstraction prior to projection profile analysis, as compared to performing projection profile analysis directly on extracted blobs, may enable additional processing operations to be performed without introducing a significant delay during text extraction. For example, although the projection profile analysis may enable determination of a skew of a line of text, such as described in further detail with respect to FIG. 12, other processing may also be performed, such as estimating tilt, compensating for weak perspective distortion, and multi-skew handling, each of which is described in further detail with respect to FIG. 10.

Referring to FIG. 9, examples 900 of text skew and tilt correction in an image based on blob abstraction are depicted. An image 902 is illustrated having text that is identified as being within a text region illustrated as a parallelogram. The text has a tilt, indicating that each letter is slanted (e.g. in italics), and the text generally follows a horizontal text line and therefore has little or no skew. The text in the image 902 may be identified using blob extraction and abstracted as ellipses or other parametric shapes. Projection profile analysis may be performed to identify an amount of tilt of each of the blobs (i.e. tilt of each of the letters in the identified text), and a tilt that is identified for each of the blobs may be compensated for to result in a compensated set of blobs 903. The compensated set of blobs 903 is illustrated as having substantially no tilt. As a result, character recognition may be performed with increased reliability by eliminating character overlap caused by tilt, as described in further detail with respect to FIG. 11.

FIG. 9 illustrates a second image 904 including characters within an identified text region. The characters within the identified text region are illustrated after blob extraction, abstraction, and skew and tilt compensation, as a compensated set of blobs 905. FIG. 9 illustrates a third image 906 including two text areas. A result of blob abstraction, extraction, and compensation applied to the third image 906 is provided as a compensated set of blobs 907.

Referring to FIG. 10, a first example 1002 is illustrated of an input image and corresponding blob extraction, abstraction, and compensation results. The first example 1002 illustrates tilt compensation applied to the text "Software That Sees" and also to the text "HOME" and "ENTERTAINMENT". Optical character recognition may be performed with greater reliability after tilt compensation. A second example 1004 illustrates weak perspective compensation. Weak perspective may be a relatively common distortion that may be caused during image capture of distant objects. Compensation for weak perspective effects may be similar to skew detection and compensation and tilt detection and compensation. A third example 1006 illustrates text line separation that enables detection of multiple text lines by identifying regions of the images as separate lines of text. A fourth example 1008 provides an example of multi-skew handling. The image in the example 1008 has three text lines, the first two text lines having a first skew direction and the third text line having a second skew direction. Multi-skew handling may perform a first projection profile analysis that identifies the bottom line of text as a single line of text and identifies the two upper lines of text as another line of text, both lines having horizontal skews. Secondary projection profile analysis on the upper portion of the image may identify the two separate lines of text each having a similar, non-horizontal skew. Examples 1002-1008 illustrate tilt compensation, perspective compensation, text line separation, and multi-skew handling having reduced computational requirements due to efficiencies arising from blob abstraction.

Referring to FIG. 11, an example 1102 of image text including tilt is illustrated. Each letter of the image text is tilted, so that a character segmentation routine that identifies vertical spaces corresponding to each letter to be examined may not identify clear separation between the letters. For example, segmentation for the letter "f" 1106 may omit both ends of the "f," causing the "f" to be un-recognizable during optical character recognition. Similarly, the letters "o" and "t" adjacent to the "f" may also be misidentified due to overlap with the "f". As another example, segmentation for the letter "h" 1110 may result in an error during optical character recognition because the left-hand portion of the "h" has been cut off.

An example 1104 of tilt-compensated text may result from blob abstraction as illustrated and described with respect to FIG. 8 as applied to the example 1102 of text having tilt. For example, blob abstraction and projection profile analysis may be performed to the blobs illustrated in example 1102 to estimate a tilt of the blobs, and the blobs may be modified based on the estimated tilt to generate the tilt-compensated text of the example 1104. The tilt-compensated text illustrates that character segmentation for the letter "f" 1108 and for the letter "h" 1112 after tilt compensation may more accurately distinguish letters.

Figure 12:
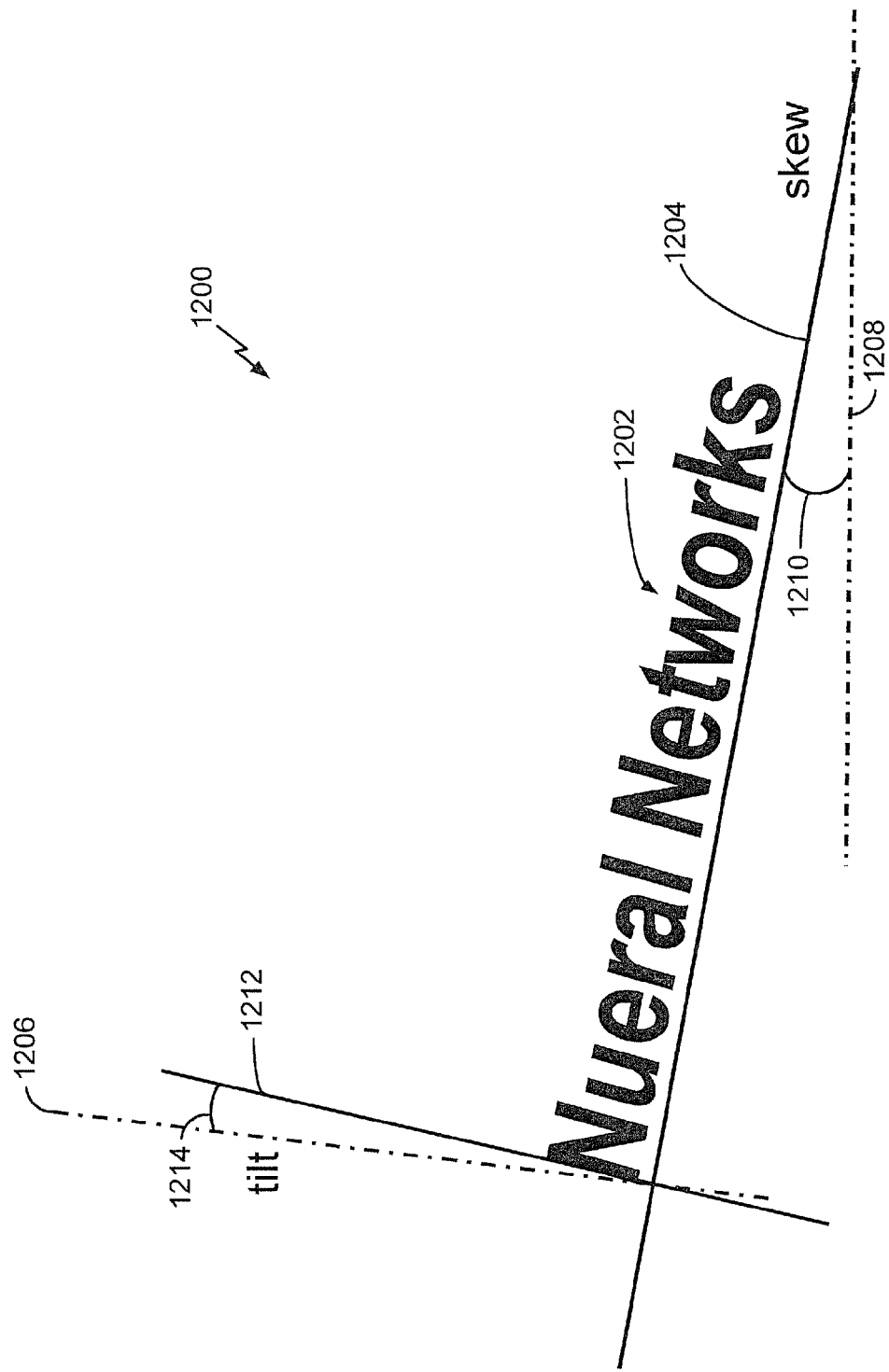
FIG. 12 is a diagram depicting an illustrative example of text skew and tilt that may be detected and corrected by the system of FIG. 1.

Referring to FIG. 12, an illustrative example 1200 of skew and tilt of text is depicted that may be detected and compensated for using the blob-based text extraction and blob abstraction prior to projection profile analysis described with respect to FIGS. 1-11. Text 1202 is illustrated having a base line 1204. The base line 1204 generally corresponds to the bottom of each of the letters of the text 1202. The baseline 1204 forms an angle 1210 with a horizontal line 1208. The angle 1210 is referred to as the skew of the text 1202. In addition, each character of the text 1202 forms an angle 1214 relative to a line 1206 that is perpendicular to the baseline 1204. The angle 1214 of the characters from the line 1206 that is perpendicular to the baseline 1204 is referred to as the tilt of the characters. As illustrated and described herein, both character skew and tilt may be detected and compensated for using reduced processing complexity as a result of blob extraction and blob abstraction prior to projection profile analysis.

Figure 13:
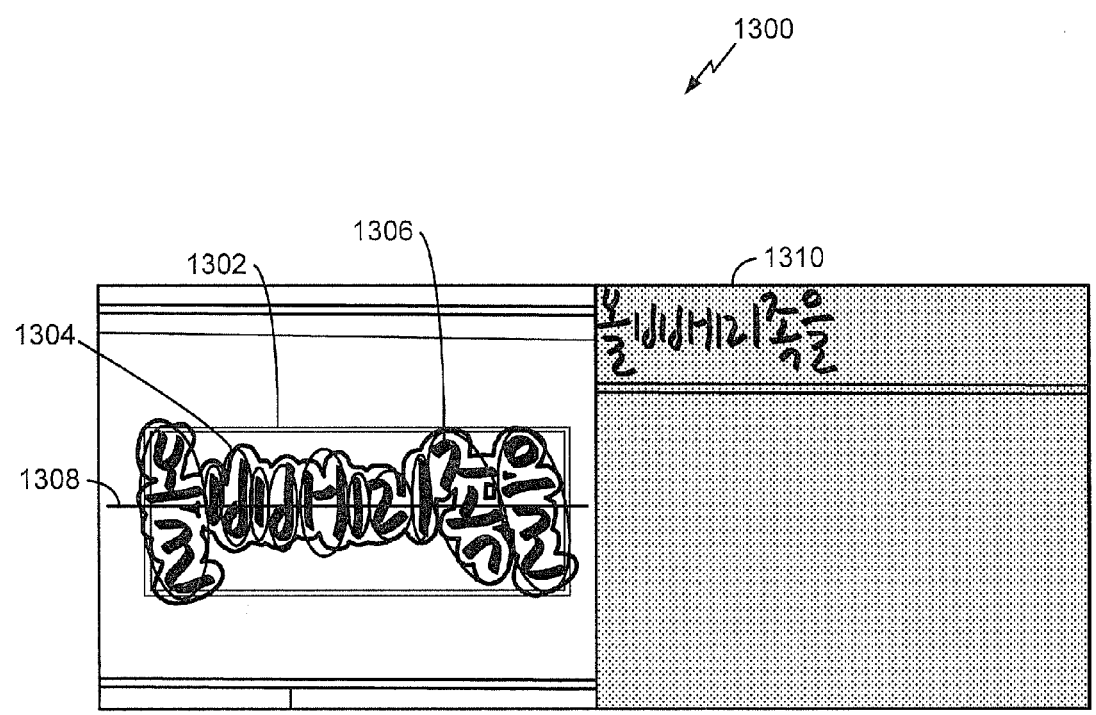
FIG. 13 illustrates a particular embodiment of centerline processing of abstracted blobs that may be performed by the system of FIG. 1.

FIG. 13 depicts an example 1300 showing a text image and a blob extraction and abstraction result 1310. In the example 1300, the text is illustrated as Korean characters. The text has been extracted and the identified blobs have been abstracted according to the representative blob abstraction 1304, illustrated as an ellipse. Because many types of text, such as Asian characters and other alphabets, may not closely conform to a headline and baseline, such as the baseline illustrated in FIG. 12, a center line identification may be used in addition to, or in place of, other alignment criteria.

For example, a first abstracted blob 1304 has a significantly smaller size than a second abstracted blob 1306. Therefore, a baseline analysis may not result in proper identification of the text line of the text 1302. However, finding a line 1308 that passes through the center of the blobs, such as using a least-mean-squared analysis, may result in identification of a center line to enable skew estimation.

Other examples of skew estimation methods that may be used in accordance with the disclosed systems and methods include base/headline fitting, which may be effective for alphabets, projection profile skew estimation, such as described with respect to FIG. 7, which may be effective with multiple lines of text, and center line fitting based on a blob abstraction, as illustrated in FIG. 13. Because a computational load for each of the skew estimation methods using abstracted blobs may be relatively small, multiple skew estimation methods may be performed and a most meaningful result or a best result of the multiple skew estimation methods may be used as a selected skew for further processing.

Figure 14:
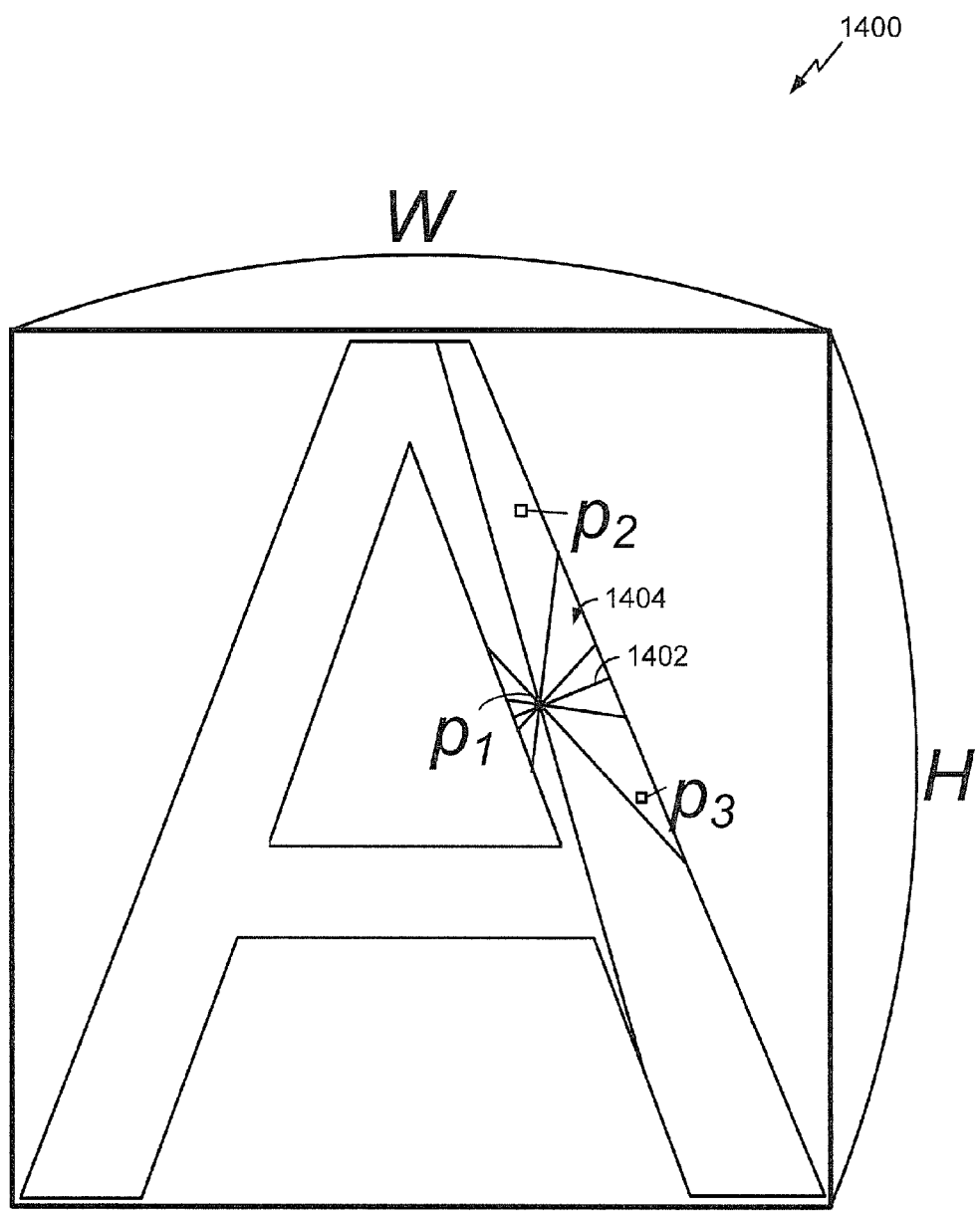
FIG. 14 is a diagram depicting an illustrative example of stroke width determination that may be performed by the system of FIG. 1.

FIG. 14 provides an illustrative embodiment 1400 of a method of determining curvilinearity using stroke width. The embodiment 1400 illustrates a blob that includes the letter A having multiple pixels, such as a first representative pixel p1, a second representative pixel p2, and a third representative pixel p3. The letter A spans a pixel area having a width W and a height H. A set of points (e.g. including p1, p2, p3) may be selected, such as according to a random or pseudo-random selection. As an example, one hundred points may be selected. For each selected point, an estimation of the stroke width may be obtained by determining a set of lines through the selected point, such as a representative set of lines 1404 illustrated through p1. Each line w may be at a different angle, and the line having the shortest length through the i-th selected point may correspond to a stroke width though the selected point ($s_i$):

$$s_i = \min\{w_1, w_2, w_3, \ldots\}$$

To illustrate, a shortest line 1402 of the illustrated set of representative lines 1404 passing through the pixel p1 indicates a stroke width of the blob at the pixel p1. Similarly, a stroke width may be determined for each selected point, and an average stroke width may be determined as an arithmetic mean of the determined stroke widths for the selected points. For example, a mean stroke width may be determined by:

$$\bar{s} = \frac{1}{N} \sum_i s_i$$

After determining the stroke width of the blob, a curvilinearity of the blob may be computed as a ratio of a size of the blob as compared to a stroke width of the blob. For example, the curvilinearity may be computed as:

$$\frac{W+H}{S}$$

After determining a stroke width and a curvilinearity of a blob, a blob may be identified as being a candidate of a text blob by determining whether the curvilinearity satisfies a threshold. For example, the threshold may be determined as a threshold providing good general results for overall text, or specific thresholds may be provided for specific types of alphabets likely to be encountered. For example, a device expected to be used in a region to identify text using Asian script may have a threshold that may be more effective for Asian script than for Latin alphabet detection, while a device expected to be used to determine text using Latin alphabets may have a second threshold that may be less effective than the first threshold at detecting blobs of Asian script.

Figure 15:
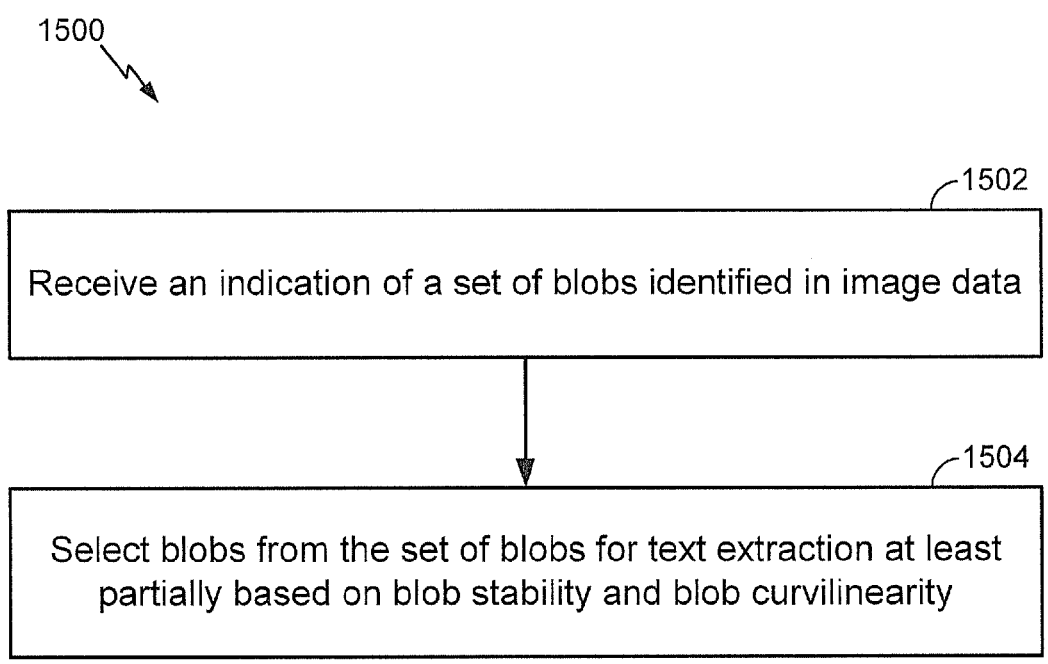
FIG. 15 depicts a flow chart of a particular illustrative embodiment of blob-based text detection.

FIG. 15 depicts a particular embodiment of a method 1500. The method 1500 includes receiving an indication of a set of blobs identified in image data, at 1502. For example, the set of blobs may be identified by the blob extractor 106 of FIG. 1 and an indication of the set of blobs identified by the blob extractor 106 of FIG. 1 may be received at the text blob selector 107 of FIG. 1. Each blob of the set of blobs may be a group of connected pixels of the image data having substantially similar pixel values. To illustrate, a group of pixels may be considered "connected" when, for any two pixels in the group, there exists an unbroken path within the group (e.g. each step of the path is from a first pixel to a second pixel that is adjacent to the first pixel) that joins the two pixels.

Blob curvilinearity is determined based on a comparison of a blob size to a blob stroke width. For example, the stable and curvilinear blob selector 108 of FIG. 1 may determine a curvilinearity measure of one or more blobs of the set of blobs. To illustrate, the curvilinearity measure may be based on a ratio of a blob size as compared to a stroke width of the blob, as described with respect to FIG. 14.

Blobs are selected from the set of blobs for text extraction at least partially based on blob stability and blob curvilinearity, at 1504. Selecting the blobs may include identifying a blob of the set of blobs satisfying a stability criterion and determining whether the most stable blob satisfies a curvilinear criterion. For example, the stable and curvilinear blob selector 108 may determine one or more blobs satisfying a stability criterion and a curvilinearity criterion. To illustrate, a stability measure of each blob of the set of blobs may be determined. Each determined stability measure may indicate a change in blob size with respect to a change in a threshold.

A blob may be identified as satisfying the stability criterion by selecting a most stable blob of the set of blobs based on a comparison of the determined stability measures. As described with respect to FIG. 4, the stability criterion may be that no other blobs are more stable than the selected blobs and may be satisfied by the blob determined to be the most stable blob of the set of blobs.

After determining that the most stable blob satisfies the curvilinear criterion, all blobs that overlap the most stable blob may be removed from the set of blobs. To illustrate, at least one blob of the set of blobs may overlap another blob of the set of blobs. The overlap region remover 110 of FIG. 1 may receive an indication from the stable and curvilinear blob selector 108 of a selected blob, and the overlap region remover 110 may remove all blobs that overlap (e.g. have one or more pixels in common with) the selected blob. In a particular embodiment, at least one blob of the set of blobs may be selected for text extraction and at least another blob of the set of blobs may not be selected for text extraction.

A set of geometric figures that correspond to the selected blobs may be determined. For example, the blob abstractor 112 of FIG. 1 may fit ellipses or other geometric figures to a set of blobs received from the text blob extractor 104. A projection profile of the set of geometric figures may be determined, such as described with respect to FIGS. 7-8.

Figure 16:
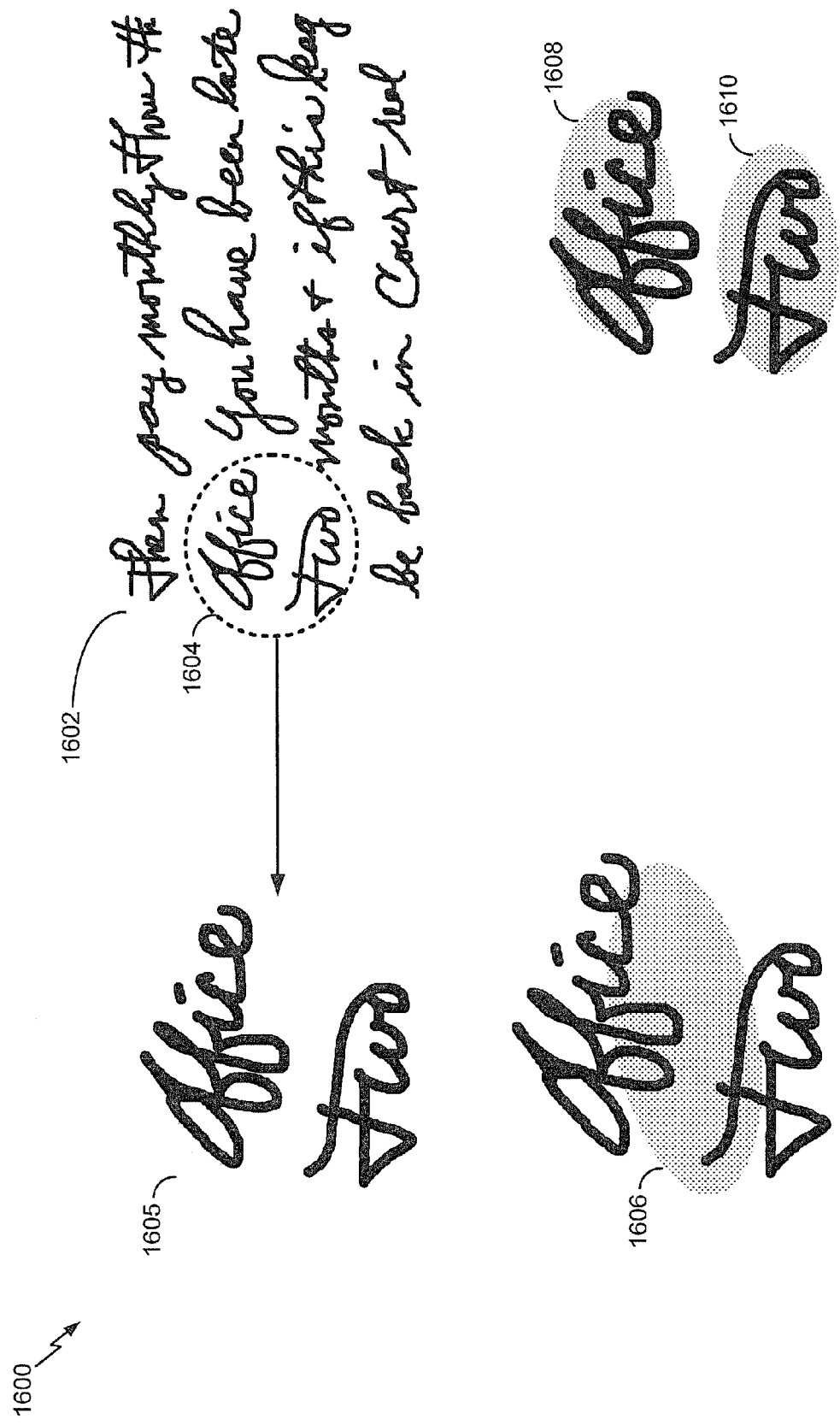
FIG. 16 illustrates examples of blob abstraction that may be performed by the system of FIG. 1.

Referring to FIG. 16, an example of blob abstraction that may be performed by the blob abstractor 112 of FIG. 1 is depicted and generally designated 1600. An image 1602 includes script text. Blob extraction corresponding to the image 1602 results in identification of a blob 1604 illustrated in an image 1605. The blob extraction corresponding to the image 1602 may be performed by the blob extractor 104 of FIG. 1. The image 1605 illustrates the extracted blob 1604 as black pixels against a white background.

Blob abstraction may be performed by identifying a first geometric figure 1606 that corresponds to the blob 1604 identified in the image 1602. The first geometric figure 1606 may be identified by computing parameters of the blob 1604, by selecting a predetermined geometric figure from a table or database of geometric figures, by one or more other techniques, or any combination thereof. Parametric figures may be used, such as ellipses, triangles, rectangles, or other shapes that may be identified using relatively few parameters, as a computationally inexpensive alternative to using the identified blobs as collections of individual pixels (and therefore having a number of parameters equal to a number of pixels in each blob).

A first fitting error of the first geometric figure 1606 may be determined and compared to a threshold. The first fitting error may correspond to a portion of the blob 1604 illustrated in the image 1605 located outside the first geometric figure 1606 compared to a total area of the blob 1604. In response to the fitting error of the first geometric figure 1606 exceeding the threshold, a second abstraction may be performed by identifying a plurality of geometric figures 1608, 1610 that correspond to the blob 1604. The plurality of geometric figures 1608, 1610 may be identified by computing parameters of the blob 1604, by selecting a predetermined geometric figure from a table or database of geometric figures, by one or more other techniques, or any combination thereof.

A second fitting error of the plurality of geometric figures 1608, 1610 may be determined. In response to a determination that the second fitting error of the plurality of geometric figures 1608, 1610 is less than the first fitting error of the first geometric figure 1606, a projection profile analysis on the plurality of geometric figures 1608, 1610 may be performed. Otherwise, the first geometric figure 1606 may be selected as a better fit to the blob 1604 and a projection profile analysis on the first geometric figure 1606 may be performed. In a particular embodiment, the first geometric figure 1606 may include an ellipse and the plurality of geometric figures 1608, 1610 may include a plurality of ellipses.

Figure 17:
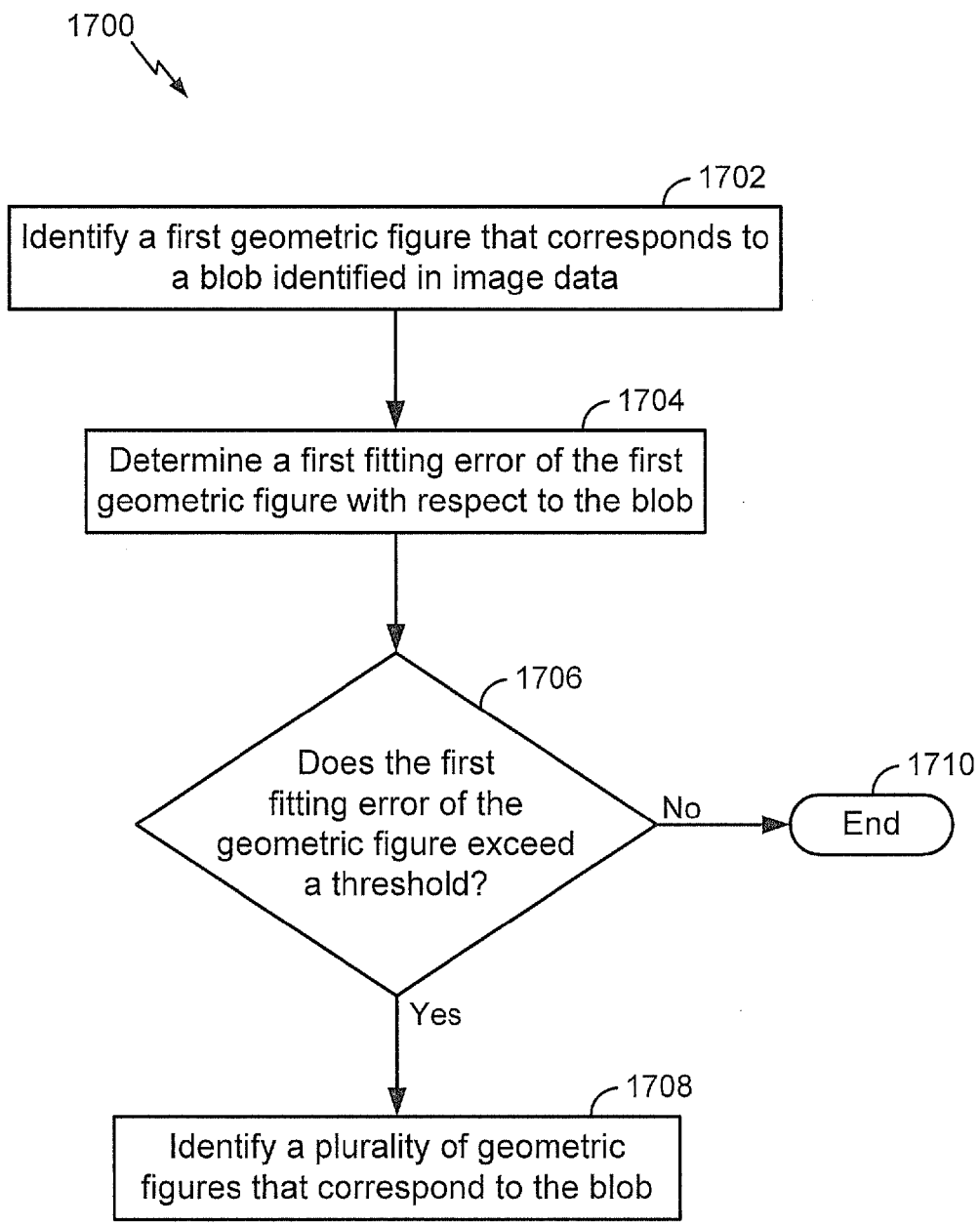
FIG. 17 depicts a flow chart of a particular illustrative embodiment of a method of blob abstraction using geometric figures that may be performed by the system of FIG. 1.

Referring to FIG. 17, a particular embodiment of a method of blob abstraction using geometric figures is depicted and generally designated 1700. The method 1700 may be performed at a blob abstractor, such as the blob abstractor 112 of FIG. 1. The method 1700 includes identifying a first geometric figure that corresponds to a blob identified in image data, at 1702. To illustrate, the blob abstractor 112 of FIG. 1 may identify the first geometric figure 1606 of FIG. 16 that corresponds to the blob 1604 in the image data 1602. The first geometric figure 1606 may be identified by computing parameters of the blob 1604, by selecting a predetermined geometric figure from a table or database of geometric figures, by one or more other techniques, or any combination thereof.

A first fitting error of the geometric figure with respect to the blob may be determined, at 1704. For example, an area of the blob 1604 located outside the first geometric figure 1606 may be compared to a total area of the blob 1604. A determination may be made whether the first fitting error of the geometric figure exceeds a threshold, at 1706. If the first fitting error does not exceed the threshold, the method ends, at 1710. If the first fitting error does exceed the threshold, a plurality of geometric figures that correspond to the blob is identified, at 1708. To illustrate, the blob abstractor 112 may identify the plurality of geometric figures including the geometric figures 1608, 1610 that correspond to the blob 1604. The plurality of geometric figures 1608, 1610 may be identified by computing parameters of the blob 1604, by selecting a predetermined geometric figure from a table or database of geometric figures, by one or more other techniques, or any combination thereof.

Figure 18:
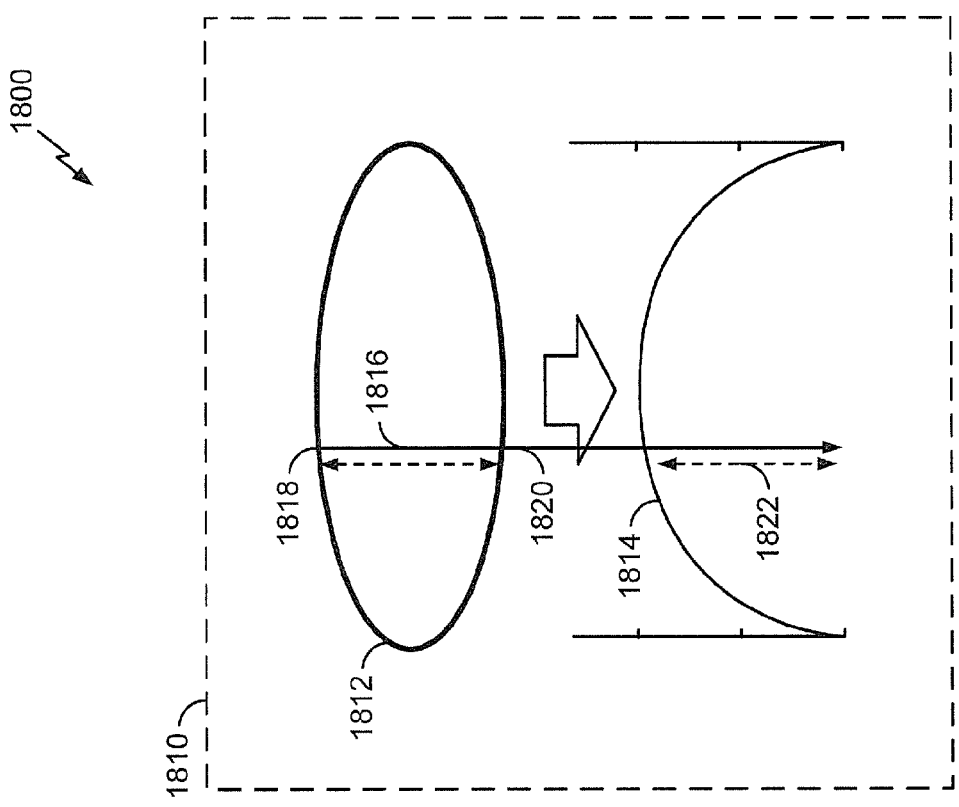
FIG. 18 is a diagram depicting an illustrative example of blob projection that may be performed by the system of FIG. 1.
Figure 18:
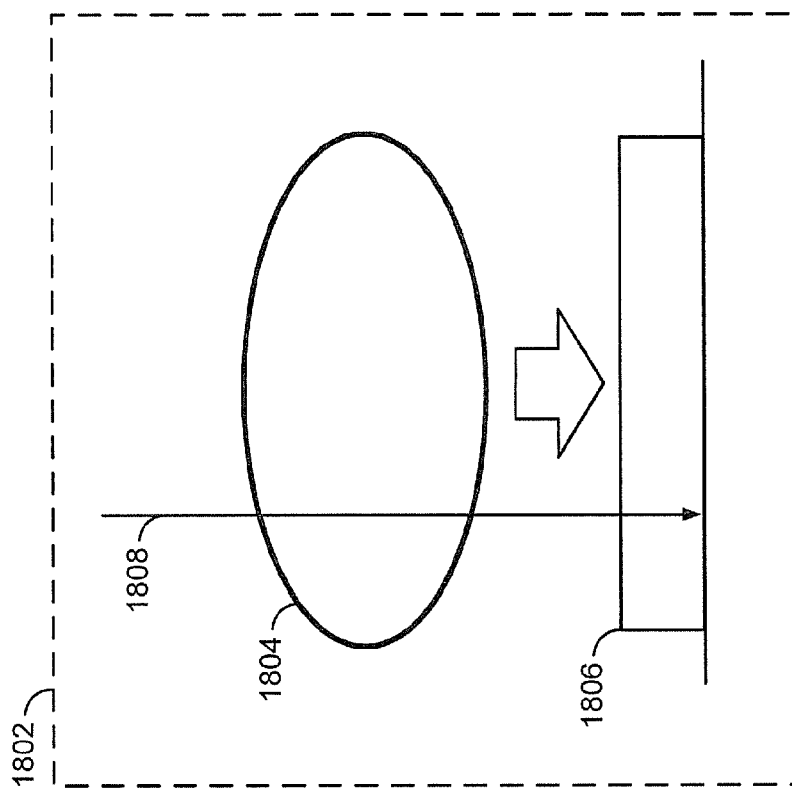

Referring to FIG. 18, an example of blob projection is depicted and generally designated 1800. A first example 1802 illustrates a representative projection line 1808 intersecting a geometric figure 1804. The geometric figure 1804 may be the geometric figure 1606 of FIG. 16. In the first example 1802, if the projection line 1808 intersects the geometric figure 1804, a binary "1" is assigned at a corresponding projection of a projection profile 1806. If the projection line 1808 does not intersect the geometric figure 1804, a binary "0" is assigned at the corresponding projection of the projection profile 1806. Multiple projection lines (e.g. the multiple projection lines 702 of FIG. 7) may be used to determine the projection profile 1806 of the geometric figure 1804. For example, every instance of a projection line, such as the representative projection line 1808, of the multiple projection lines intersecting the geometric figure 1804 results in a binary "1" being assigned at the corresponding point of the projection profile 1806.

A second example 1810 illustrates a projection line 1816 intersecting a geometric figure 1812. The geometric figure 1812 may be the geometric figure 1606 of FIG. 16. In the second example 1810, the projection line 1816 is shown to intersect the geometric figure 1812 at two different intersections 1818, 1820. The distance between the two intersections 1818, 1820 is computed and used to determine a corresponding projection of a projection profile 1814 of the geometric figure 1812. Multiple projection lines (such as the set of projection lines 706 of FIG. 7) may be used to determine the projection profile 1814 of the geometric figure 1812. For example, for every instance of a projection line 1816 of the multiple projection lines intersecting the geometric figure 1812, a determination may be made whether the projection line 1816 intersects the geometric figure 1812 at a second instance. If the geometric figure 1812 is intersected by a projection line at two different intersections (e.g., instances 1818, 1820), a distance between the two different intersections 1818, 1820 may be assigned to a corresponding projection (e.g., a projection 1822) of the projection profile 1814 of the geometric figure. If a projection line does not intersect the geometric figure 1812 or intersects the geometric figure 1812 only at a single instance, a binary "0" may be assigned to a corresponding projection of the projection profile 1814 of the geometric figure 1812.

Projecting blobs according to the second example 1810 of FIG. 18 may result in a more accurate reflection of the blob than projecting blobs according to the first example 1802. For example, projecting blobs according to the second example 1810 may reflect the shape of connected characters, such as cursive and Indian scripts, more accurately than projecting blobs according to the first example 1802.

Figure 19:
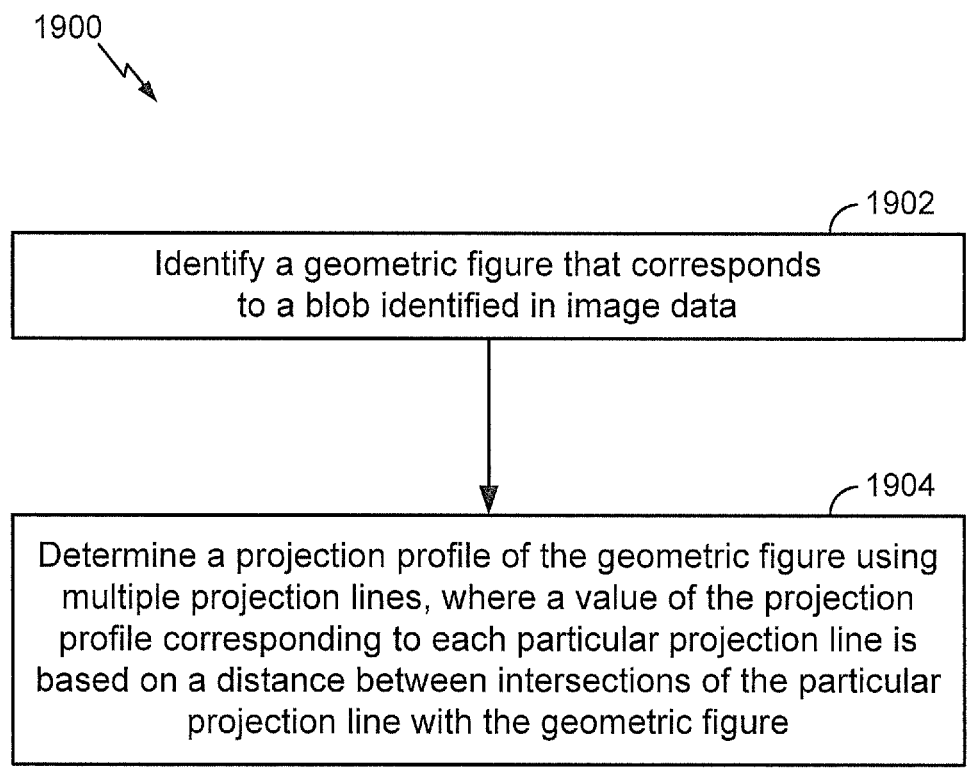
FIG. 19 depicts a flow chart of a particular illustrative embodiment of a method of blob projection using geometric figures that may be performed by the system of FIG. 1.

Referring to FIG. 19, a particular embodiment of a method of blob projection using geometric figures is depicted and generally designated 1900. The method 1900 may be performed at the text region detector and binarization engine 114 of FIG. 1. The method 1900 includes identifying a geometric figure that corresponds to a blob identified in image data, at 1902. To illustrate, the geometric figure may correspond to the geometric figure 1812 of FIG. 18. The geometric figure 1812 may be identified by computing parameters of a blob, by selecting a predetermined geometric figure from a table or database of geometric figures, by one or more other techniques, or any combination thereof.

A determination may be made of a projection profile of the geometric figure using multiple projection lines, where a value of the projection profile corresponding to each particular projection line is based on a distance between intersections of the particular projection line with the geometric figure, at 1904. To illustrate, the projection profile 1814 of FIG. 18 of the geometric figure 1812 may be determined. A value of the projection profile corresponding to each particular projection line may be based on a distance between intersections of the particular projection line with the geometric figure. For example, the projection 1822 is based on the distance 1816 between the intersections 1818, 1820.

Figure 20:
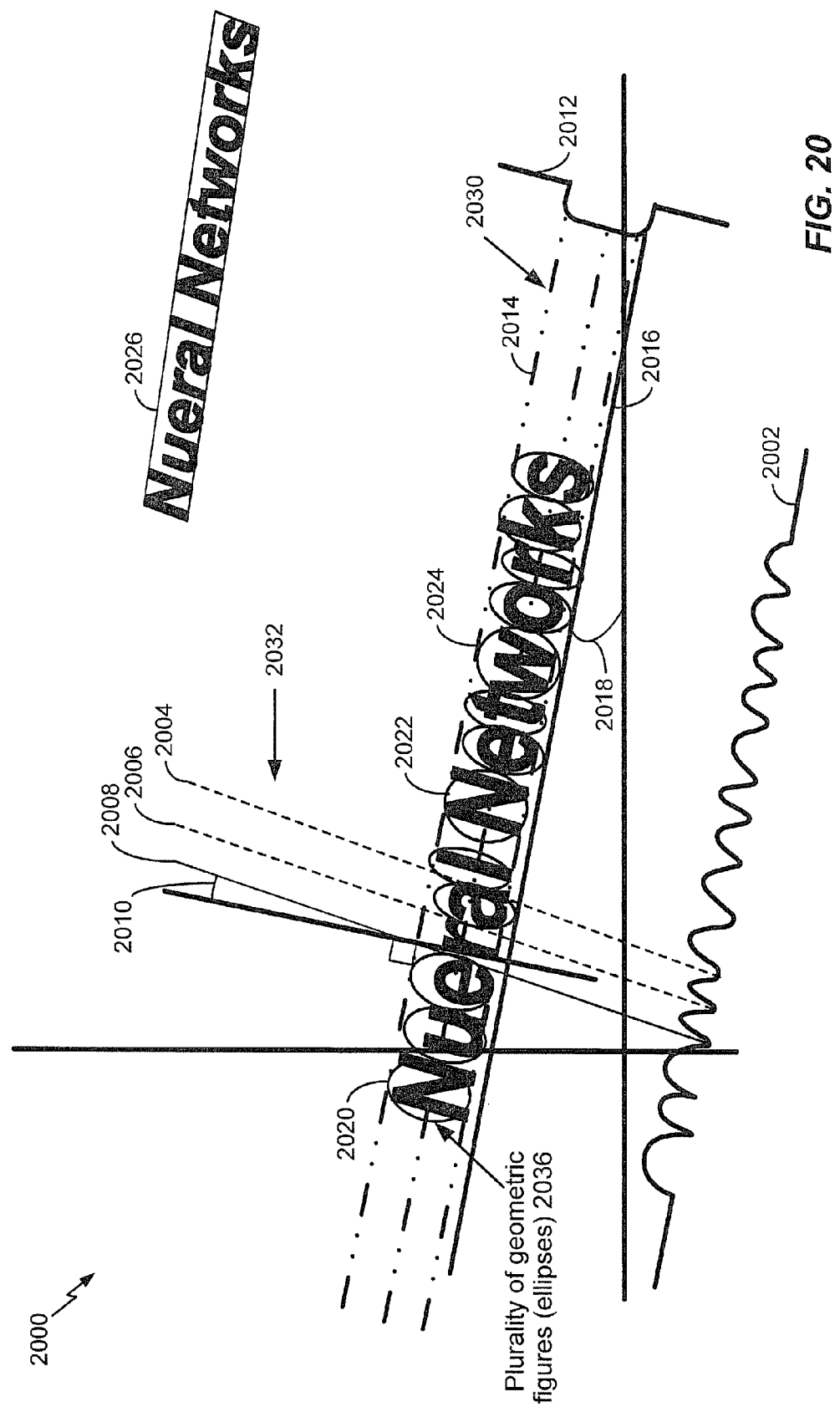
FIG. 20 is a diagram depicting an illustrative example of projection profile analysis that may be performed by the system of FIG. 1.

Referring to FIG. 20, an example of a projection profile analysis is depicted and generally designated 2000. A first set of parallel projection lines 2030 including representative projection lines 2014, 2016 are projected through a plurality of geometric figures 2036 (illustrated as ellipses) that correspond to blobs identified as text in image data, such as the representative geometric figures 2020, 2022, and 2024. The first set of parallel projection lines 2030 corresponds to a first angle 2018 and is projected through the plurality of geometric figures 2036 to determine a first projection profile 2012 of the plurality of geometric figures 2036. A skew of the text corresponds to the first angle 2018 of the first set of parallel projection lines 2030 to a horizontal reference. The first projection profile 2012 may be determined by projecting multiple projection profiles corresponding to angles of multiple sets of parallel projection lines intersecting the plurality of geometric figures 2036. The first projection profile 2012 may be determined by selecting a projection profile from the multiple projection profiles that is smaller than any other projection profile of the multiple projection profiles (e.g. that results from a fewer number of parallel projection lines intersecting the plurality of geometric figures 2036).

A second set of parallel projection lines 2032 including representative projection lines 2004, 2006, 2008 are projected through the plurality of geometric figures 2036. The second set of parallel projection lines 2032 corresponds to a second angle 2010 and is projected through the plurality of geometric figures 2036 to determine a second projection profile 2002 of the plurality of geometric figures 2036. A tilt of the text corresponds to the second angle 2010 of the second set of parallel projection lines 2032 indicating a deviation from perpendicular from the text line (e.g., perpendicular to the projection line 2014). The second projection profile 2012 may be determined by projecting multiple projection profiles corresponding to angles of multiple sets of parallel projection lines intersecting the plurality of geometric figures 2036. The second projection profile 2002 may be determined by selecting a projection profile from the multiple projection profiles that has fewer intersections of parallel projection lines with the plurality of geometric figures 2036 than any other projection profile of the multiple projection profiles.

A bounding box 2026 may be estimated. The bounding box 2026 may be selected to encompass the text. The bounding box may have at least six degrees of freedom. An example of six degrees of freedom includes an "x" and "y" coordinate location of the bounding box 2026, a height and width of the bounding box 2026, and the first angle 2016 and the second angle 2010.

Figure 21:
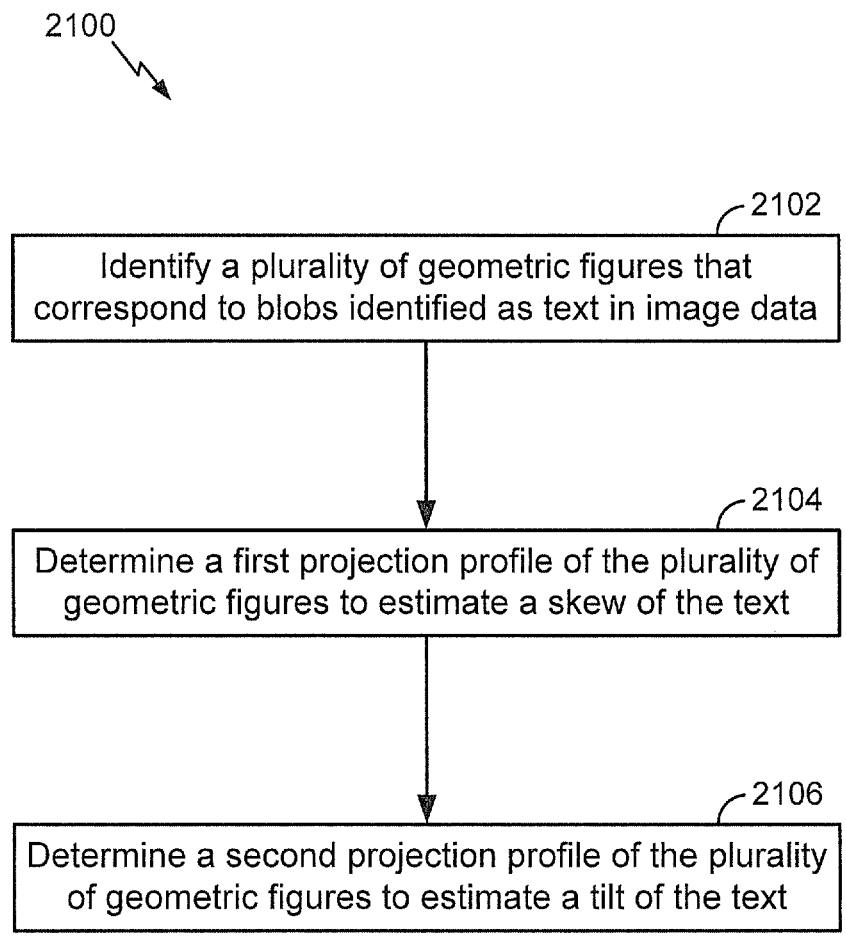
FIG. 21 depicts a flow chart of a particular illustrative embodiment of a method of projection profile analysis that may be performed by the system of FIG. 1.

Referring to FIG. 21, a particular embodiment of a method of a projection profile analysis is depicted and generally designated 2100. The method 2100 may be performed at the text region detector and binarization engine 114 of FIG. 1. The method 2100 includes identifying a plurality of geometric figures that corresponds to blobs identified as text in image data, at 2102. To illustrate, the plurality of geometric figures may be the plurality of geometric figures 2036 of FIG. 20. The plurality of geometric figures 2036 may be identified by computing parameters of a blob, by selecting a predetermined geometric figure from a table or database of geometric figures, by one or more other techniques, or any combination thereof.

A determination of a first projection profile of the plurality of geometric figures may be made to estimate a skew of the text, at 2104. To illustrate, multiple projection profiles corresponding to angles of multiple sets of parallel projection lines may be projected to intersect the plurality of geometric figures 2036 of FIG. 20. The first projection profile 2012 may be determined by selecting a projection profile from the multiple projection profiles that has the most compact support, where support is defined as a region whose projection profile result is not zero.

A determination of a second projection profile of the plurality of geometric figures may be made to estimate a tilt of the text, at 2106. To illustrate, the second projection profile 2002 of FIG. 20 may be determined by projecting multiple projection profiles corresponding to angles of multiple sets of parallel projection lines intersecting the plurality of geometric figures 2036 and by selecting a projection profile from the multiple projection profiles that has the most compact support.

Figure 22:
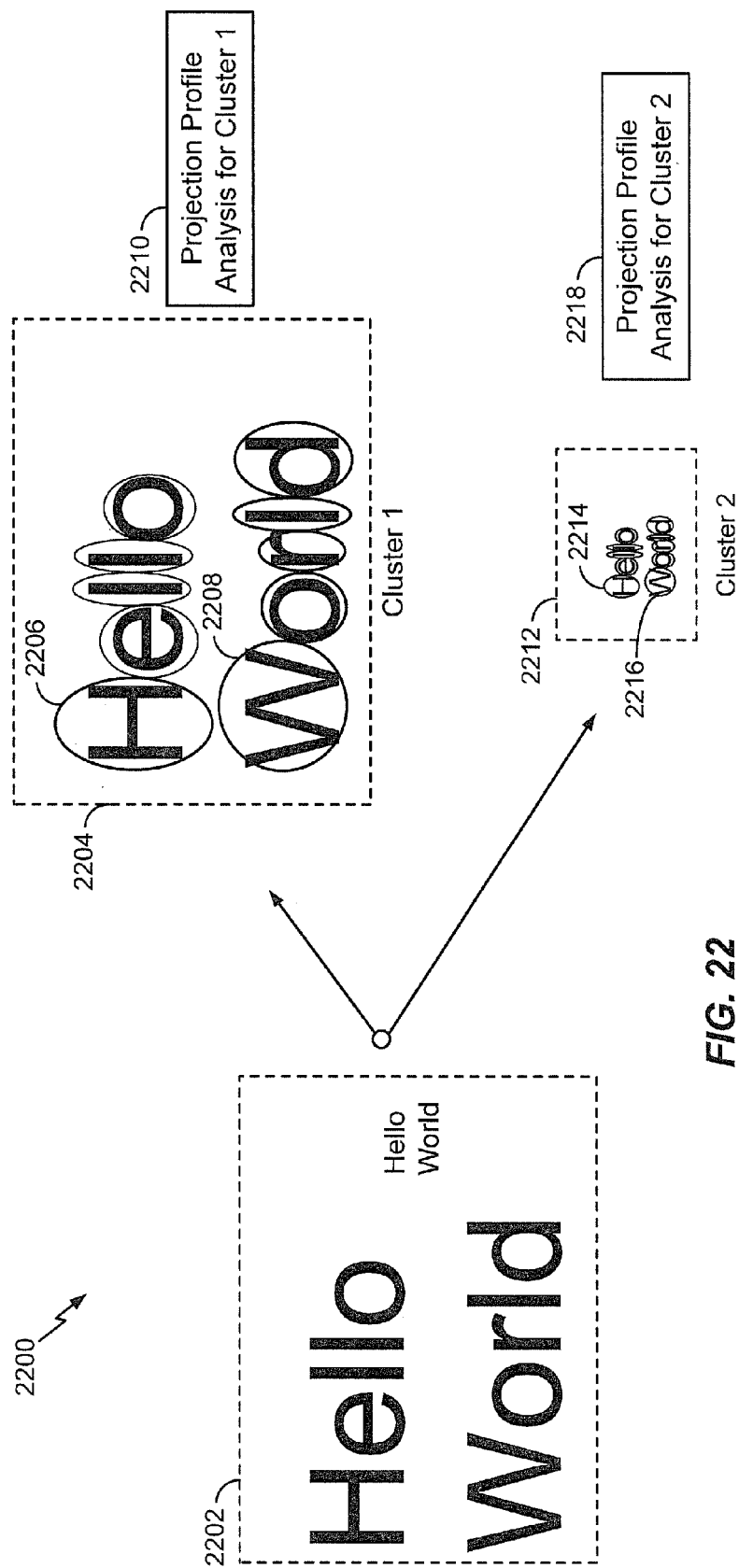
FIG. 22 is a diagram depicting an illustrative example of partitioning a set of blobs that may be performed by the system of FIG. 1.

Referring to FIG. 22, an example of partitioning a set of blobs is depicted and generally designated 2200. A first extracted set of blobs 2202 identified in image data comprises the phrase "Hello World" in two distinct fonts (e.g., stroke width). The first extracted set of blobs 2202 may be partitioned into multiple clusters, such as two clusters 2204, 2212. The partitioning may be based at least on a stroke width of the text of the blob 2202. For example, the stroke width of the letter "H" 2206 is similar to the stroke width of the letter "W" 2208 in the first cluster 2204. In an alternative example, the stroke width of the letter "H" 2214 is similar to the stroke width of the letter "W" 2216 of the second cluster 2212. Alternatively, or in addition, the partitioning may be based at least in part on a color similarity of the blobs, on one or more characteristics of the blobs, or any combination thereof.

A first and second projection profile 2210, 2218 may be separately determined for the first cluster 2204 and the second cluster 2212, respectively, so that the first cluster 2204 does not interfere with the second projection profile 2218 and the second cluster 2212 does not interfere with the first projection profile 2210. The projection profiles 2210, 2218 may be determined according to the method 1900 of FIG. 19, the method 2100 of FIG. 21, or a combination thereof, in a particular embodiment.

It will be appreciated that partitioning a set of blobs according to FIG. 22 may result in finding text lines in a more reliable manner as compared to performing a projection profile analysis on the un-partitioned cluster of blobs 2202. It will also be appreciated that other image components, including non-text blobs, are less likely to interfere with text line extraction for a given cluster.

Figure 23:
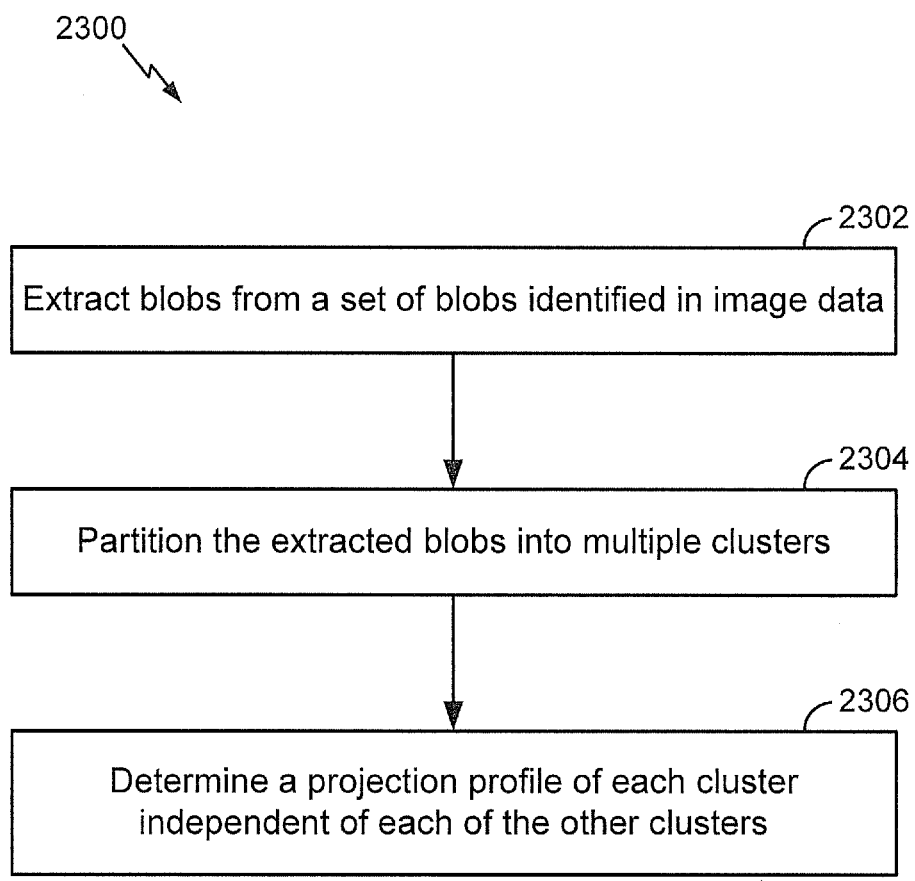
FIG. 23 depicts a flow chart of a particular illustrative embodiment of a method of partitioning a set of blobs that may be performed by the system of FIG. 1.

Referring to FIG. 23, a particular embodiment of a method of partitioning a set of blobs is depicted and generally designated 2300. The method 2300 may be performed at the text region detector and binarization engine 114 of FIG. 1. The method 2300 includes extracting blobs from a set of blobs identified in image data, at 2302. To illustrate, the set of blobs 2202 of FIG. 22 may be extracted as text candidates from a set of blobs identified in image data.

The extracted blobs may be partitioned into multiple clusters, at 2304. To illustrate, the set of blobs 2202 may be partitioned into the first cluster 2204 and the second cluster 2212. The partitioning may be based at least in part on the stroke width of the text of individual blobs in the set of blobs 2202. For example, the stroke width of the individual blob corresponding to the letter "H" 2206 is similar to the stroke width of the individual blob corresponding to the letter "W" 2208 in the first cluster 2204. In an alternative example, the stroke width of the individual blob corresponding to the letter "H" 2214 is similar to the stroke width of the individual blob corresponding to the letter "W" 2216 of the second cluster 2212. Alternatively, or in addition, the partitioning may be based at least in part on a color similarity of the blobs, on one or more characteristics of the blobs, or any combination thereof.

A projection profile of each cluster may be determined independent of each of the other clusters, at 2306. To illustrate, the first and second projection profiles 2210, 2218 may be separately determined for the first cluster 2204 and the second cluster 2212, respectively, so that the first cluster 2204 does not interfere with the second projection profile 2218 and the second cluster 2212 does not interfere with the first projection profile 2210. The projection profiles 2210, 2218 may be determined according to the method 2100 of FIG. 21.

It will be appreciated that the clustering method of FIG. 23 may result in finding text lines in a more reliable manner as compared to performing a projection profile analysis on the un-partitioned cluster of the blobs 2202 of FIG. 22. It will also be appreciated that other image components, including non-text blobs, are less likely to interfere with text line extraction for a given cluster.

Figure 24:
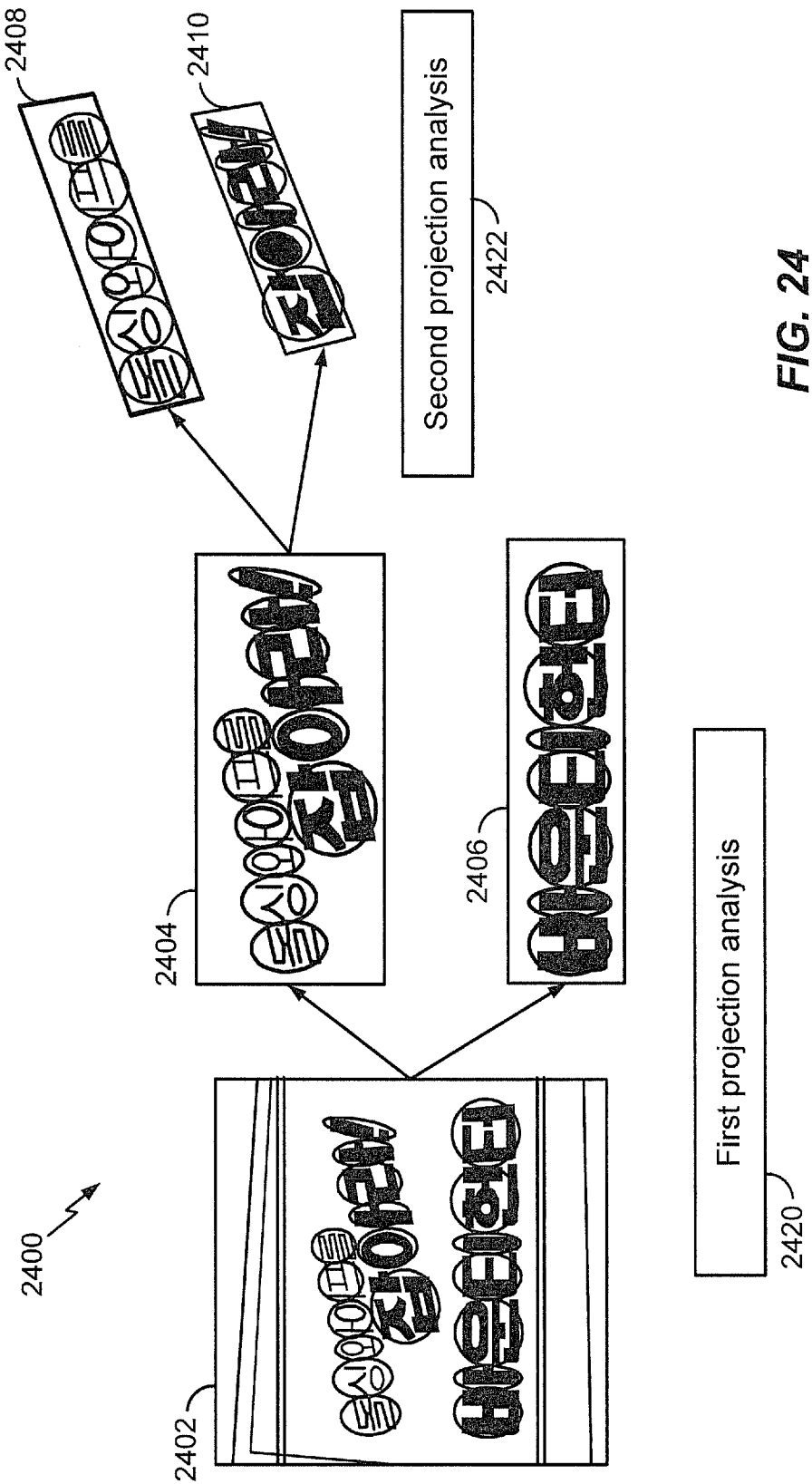
FIG. 24 is a diagram depicting an illustrative example of multiple projection profile analysis on geometric figures that may be performed by the system of FIG. 1.

Referring to FIG. 24, an example of performing multiple projection profile analysis on geometric figures is depicted and generally designated 2400. A first image may include a first set of geometric figures 2402 that corresponds to blobs identified in image data. A first projection profile analysis 2420 may be performed on the first set of geometric figures 2402 to partition the first set of geometric figures 2402 into a second set of geometric figures 2404 and a third set of geometric figures 2406. The first projection profile analysis 2420 may be performed according to the method 2100 of FIG. 21.

A second projection profile analysis 2422 may be performed on the second set of geometric figures 2404 to partition the second set of geometric figures 2404 into a fourth set of geometric figures 2408 and a fifth set of geometric figures 2410. The second projection profile analysis 2422 may be performed according to the method 2100 of FIG. 21. In a particular embodiment, the third set of geometric figures 2406 may correspond to a first line of text, the fourth set of geometric figures 2408 may correspond to a second line of text, and the fifth set of geometric figures 2410 may correspond to a third line of text.

It will be appreciated that performing multiple projection profile analysis as illustrated in FIG. 24 may result in finding text lines having similar stroke width and color but different skews.

Figure 25:
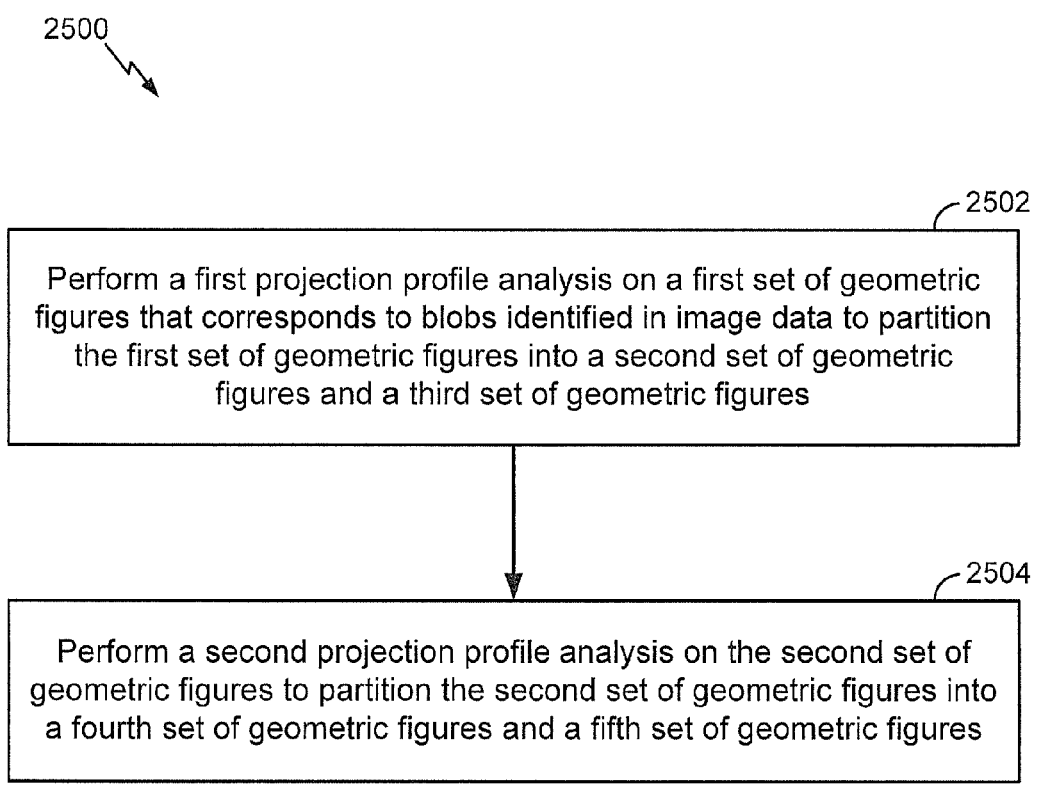
FIG. 25 depicts a flow chart of a particular illustrative embodiment of a method of performing multiple projection analysis on geometric figures that may be performed by the system of FIG. 1.

Referring to FIG. 25, a method of performing multiple projection profile analysis on geometric figures is depicted and generally designated 2500. The method 2500 may be performed at the text region detector and binarization engine 114 of FIG. 1. The method 2500 includes performing a first projection profile analysis on a first set of geometric figures that corresponds to blobs identified in image data to partition the first set of geometric figures into a second set of geometric figures and a third set of geometric figures, at 2502. To illustrate, a first projection profile analysis may be performed on the first set of geometric figures 2402 of FIG. 24 to partition the first set of geometric figures 2402 into a second set of geometric figures 2404 and a third set of geometric figures 2406. The first projection profile analysis may be performed according to the method 2100 of FIG. 21.

A second projection profile analysis on the second set of geometric figures may be performed to partition the second set of geometric figures into a fourth set of geometric figures and a fifth set of geometric figures, at 2504. To illustrate, a second projection profile analysis may be performed on the second set of geometric figures 2404 of FIG. 24 to partition the second set of geometric figures 2404 into the fourth set of geometric figures 2408 and the fifth set of geometric figures 2410. The second projection profile analysis may be performed according to the method 2100 of FIG. 21. Additional projection profile analysis may be performed on the third, fourth, and fifth sets of geometric figures 2406, 2408, 2410 based at least in part on a width of an individual blob corresponding to a character, a color of the character within the blob, one or more characteristics of the blob, or any combination thereof. The additional projection profile analysis may be performed until resulting sets of geometric figures cannot be further separated into distinct lines of text.

Figure 26:
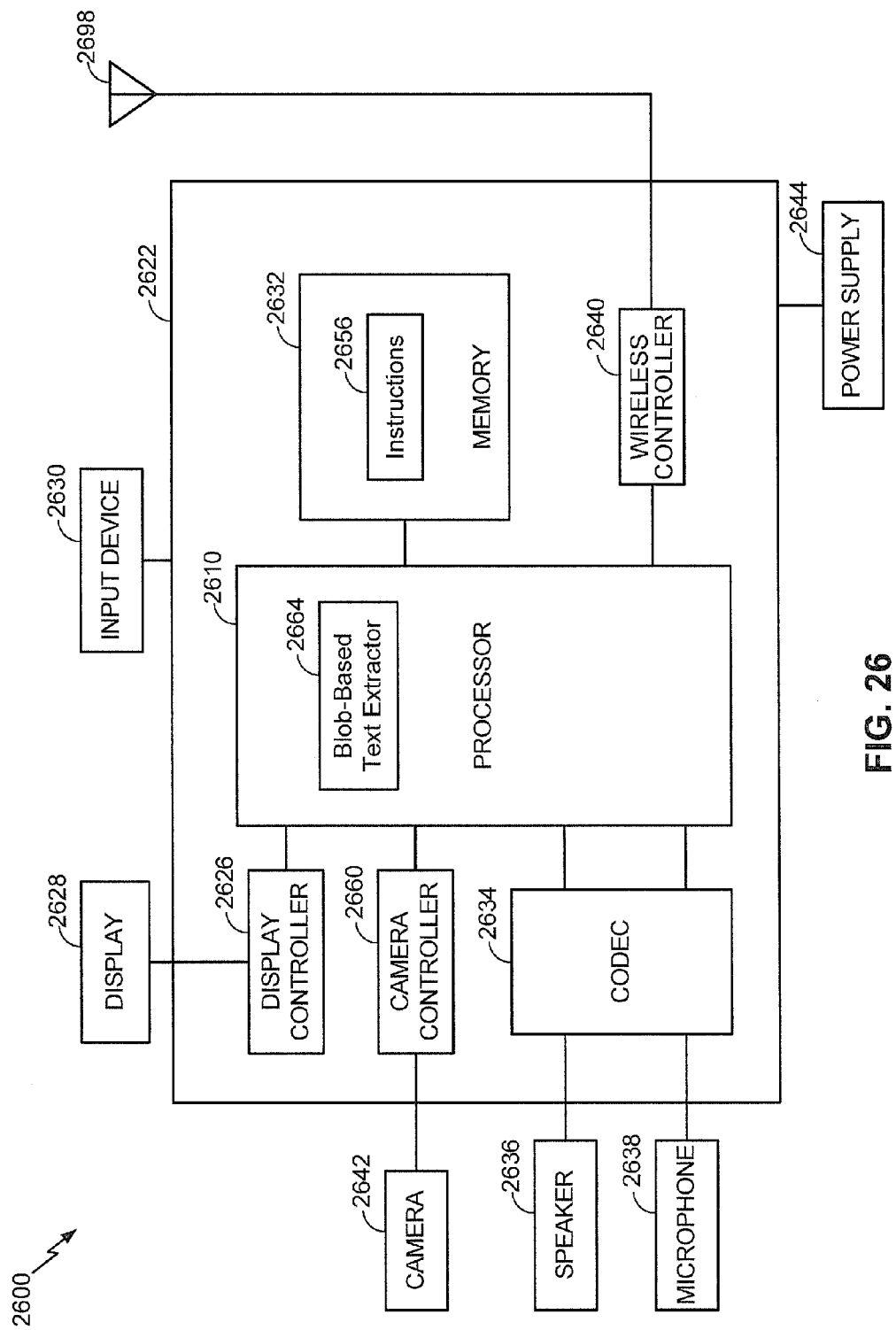
FIG. 26 is a block diagram of portable device including a blob-based text extractor.

Referring to FIG. 26, a block diagram of a particular illustrative embodiment of an electronic device including a blob-based text extractor 2664 is depicted and generally designated 2600. The device 2600 includes a processor, such as a digital signal processor (DSP) 2610, coupled to a memory 2632. In an illustrative example, the blob-based text extractor 2664 may include the system 100 of FIG. 1, or may operate according to any one or more of FIGS. 2-25, or any combination thereof.

In a particular embodiment, the blob-based text extractor 2264 may be integrated into the processor 2610 and may include dedicated circuitry or other logic to perform at least a portion of the functionality described with respect to FIG. 1. In a particular embodiment, the memory 2632 includes instructions 2656 that may be executable by the processor 2610 to cause the processor 2610 to perform at least a portion of the functionality described with respect to any of FIGS. 1-25. For example, the instructions 2656 may include instructions that are executable by a computer (the processor 2610) to cause the computer to perform the method 200 of FIG. 2, the method 1500 of FIG. 15, the method 1700 of FIG. 17, the method 1900 of FIG. 19, the method 2100 of FIG. 21, the method 2300 of FIG. 23, the method 2500 of FIG. 25, or any combination thereof. To illustrate, the instructions 2656 may include code for receiving an indication of a set of image regions (e.g. a set of blobs) identified in image data and code for selecting image regions from the set of image regions for text extraction at least partially based on stability and curvilinearity.

FIG. 26 illustrates a camera 2642 that may be coupled to a camera controller 2660 and may provide image data to the blob-based text extractor 2664 for the blob-based text extractor 2664 to detect text in image data or video data received from the camera 2642. FIG. 26 also shows a display controller 2626 that is coupled to the processor 2610 and to a display 2628. A coder/decoder (CODEC) 2634 can also be coupled to the processor 2610. A speaker 2636 and a microphone 2638 can be coupled to the CODEC 2634.

FIG. 26 also indicates that a wireless controller 2640 can be coupled to the processor 2610 and to a wireless antenna 2698. In a particular embodiment, the processor 2610, the camera controller 2660, the display controller 2626, the memory 2632, the CODEC 2634, and the wireless controller 2640 are included in a system-in-package or system-on-chip device 2622. In a particular embodiment, an input device 2630 and a power supply 2644 are coupled to the system-on-chip device 2622. Moreover, in a particular embodiment, as illustrated in FIG. 26, the display 2628, the camera 2642, the input device 2630, the speaker 2636, the microphone 2638, the wireless antenna 2698, and the power supply 2044 are external to the system-on-chip device 2622. However, each of the display 2628, the camera 2642, the input device 2630, the speaker 2636, the microphone 2638, the wireless antenna 2698, and the power supply 2644 can be coupled to a component of the system-on-chip device 2622, such as an interface or a controller.

In conjunction with the described systems and methods, a method of performing blob abstraction may include converting a blob to a simplified geometric form before estimating projection, where estimating the projection is based on parameters of the simplified geometric form. For example, the method may be performed by the blob abstractor 112 of FIG. 1. The blob that is converted to the simplified geometric form may be a pixel-domain blob that is received from a text blob extractor, such as the text blob extractor 104 or FIG. 1. However, in other embodiments, the method may be performed using blobs that have not been selected based on one or more of a curvilinearity, stability, and/or overlapping criteria that are described with respect to FIG. 1 and may instead be received from a general blob extractor, such as the general blob extractor 106 of FIG. 1.

The simplified geometric form may be any type of geometric form or combination of geometric forms, such as an ellipse, oval, trapezoid, parallelogram, rhombus, rectangle, triangle, any other type of polygon, or any combination thereof, that may be described using a number of parameters that is less than a number of pixels in the blob, such as described with respect to FIG. 8. In some embodiments, blob abstraction includes "converting" the blob to a simplified geometric form by applying one or more techniques (e.g. energy minimization or least-squared-error) to determine parameters of the simplified geometric form based on characteristics of the blob without altering the blob itself. After determining the simplified geometric form, projection profile analysis may be performed using the simplified geometric form to estimate a skew, a tilt, both a skew and a tilt, or one or more other characteristics associated with the blob. The blob may be altered to compensate for characteristics that are determined using the simplified geometric form. For example, when an estimated tilt of text corresponding to the blob is determined based on one or more estimated projections of the simplified geometric form, the blob may be modified to substantially compensate for the estimated tilt by applying a rotation transformation to the blob.

In conjunction with the described systems and methods, an apparatus is disclosed that includes means for identifying a set of image regions in image data, such as the blob extractor 106 of FIG. 1 or any other circuitry or processor configured to identify one or more image regions in the image data 102 of FIG. 1. An apparatus also includes means for selecting image regions from the set of blobs for text extraction at least partially based on blob stability. The apparatus may include the stable and curvilinear blob selector 108 of FIG. 1 or any other circuitry or processor configured to apply stability processing such as described with respect to FIGS. 1-2, and 4, as illustrative examples. Curvilinearity processing may also be applied, such as described with respect to FIGS. 1-2, 4, and 14.

In conjunction with the described systems and methods, an apparatus is disclosed that includes means for identifying a geometric figure that corresponds to an image region, the image region corresponding to at least a portion of text identified in image data. The apparatus may include the blob abstractor 112 of FIG. 1, the processor 2610 programmed to execute the instructions 2656 of FIG. 26, or any other circuitry or processor configured to identify a geometric figure that corresponds to an image region, the image region corresponding to at least a portion of text identified in the image data. An apparatus also includes means for determining a bounding box for the text based at least partially on the geometric figure. The apparatus may include the blob abstractor 112 of FIG. 1, the text region detector and binarization engine 114 of FIG. 1, the processor 2610 programmed to execute the instructions 2656 of FIG. 26, or any other circuitry or processor configured to determine a bounding box for the text based at least partially on the geometric figure.

An apparatus may include means for identifying a plurality of geometric figures that correspond to the image region in response to a first fitting error of the geometric figure exceeding a threshold. The apparatus may include the blob abstractor 112 of FIG. 1, the processor 2610 programmed to execute the instructions 2656 of FIG. 26, or any other circuitry or processor configured to identify a plurality of geometric figures that correspond to the image region in response to a first fitting error of the geometric figure exceeding a threshold.

An apparatus may include means for determining a projection profile of the geometric figure using multiple projection lines, where a value of the projection profile corresponding to each particular projection line is based on a distance between intersections of the particular projection line with the geometric figure. The apparatus may include the text region detector and binarization engine 114 of FIG. 1, the processor 2610 programmed to execute the instructions 2656 of FIG. 26, or any other circuitry or processor configured to determine a projection profile of the geometric figure using multiple projection lines.

An apparatus may include means for identifying a plurality of geometric figures that correspond to image regions, each of the image regions corresponding to at least a portion of the text. The apparatus may include the blob abstractor 112 of FIG. 1, the processor 2610 programmed to execute the instructions 2656 of FIG. 26, or any other circuitry or processor configured to identify the plurality of geometric figures that correspond to blobs identified as text in image data. An apparatus may also include means for determining a first projection profile of the plurality of geometric figures to estimate a skew of the text and means for determining a second projection profile of the plurality of geometric figures to estimate a tilt of the text. The apparatus may include the text region detector and binarization engine 114 of FIG. 1, the processor 2610 programmed to execute the instructions 2656 of FIG. 26, or any other circuitry or processor configured to determine projection profiles of the plurality of geometric figures to estimate the skew and the tilt of the text.

An apparatus may include means for extracting image regions from a set of image regions, each of the image regions corresponding to at least apportion of the text, such as the text region detector and binarization engine 114 of FIG. 1, the processor 2610 programmed to execute the instructions 2656 of FIG. 26, or any other circuitry or processor configured to extract blobs from a set of blobs identified in image data. An apparatus may also include means for partitioning the extracted image regions into multiple clusters and means for determining a projection profile of each cluster independent of each of the other clusters. The apparatus may include the text region detector and binarization engine 114 of FIG. 1, the processor 2610 programmed to execute the instructions 2656 of FIG. 26, or any other circuitry or processor configured to partition extracted blobs into multiple clusters and determine a projection profile of each cluster independent of each of the other clusters.

An apparatus may include means for performing a first projection profile analysis on a first set of geometric figures that correspond to image regions identified in the image data to partition the first set of geometric figures into a second and third set of geometric figures. The apparatus may include the text region detector and binarization engine 114 of FIG. 1, the processor 2610 programmed to execute the instructions 2656 of FIG. 26, or any other circuitry or processor configured to perform the first projection profile analysis on the first set of geometric figures. An apparatus may also include means for performing a second projection profile analysis on the second set of geometric figures to partition the second set of geometric figures into a fourth set of geometric figures and a fifth set of geometric figures. The apparatus may include the text region detector and binarization engine 114 of FIG. 1, the processor 2610 programmed to execute the instructions 2656 of FIG. 26, or any other circuitry or processor configured to perform a second projection profile analysis on the second set of geometric figures to partition the second set of geometric figures into a fourth set of geometric figures and a fifth set of geometric figures.

Although various aspects are described with respect to blobs, in other embodiments text extraction may be at least partially based on non-blob image regions. For example, a method may include receiving an indication of a set of image regions identified in image data and selecting image regions from the set of image regions for text extraction at least partially based on one or more criteria. In a particular embodiment, the method includes selecting image regions from the set of image regions for text extraction at least partially based on image region stability. In some embodiments, the image regions may be blobs (e.g. may be connected groups of pixels having substantially similar pixel values). In other embodiments one or more (or all) of the image regions may not be blobs and may instead be regions of the image data, possibly overlapping, that are identified according to one or more selection criteria and that may be further processed for text-related characteristics, such as stability.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method comprising:
   receiving an indication of a set of image regions identified in image data;
   determining one or more stability measures for the set of image regions, wherein at least one stability measure of the one or more stability measures corresponds to an amount of change of a size of a corresponding image region of the set of image regions, and wherein the change of the size is responsive to a change in a threshold value; and
   selecting one or more image regions from the set of image regions for text extraction at least partially based on the one or more stability measures.

2. The computer-implemented method of claim 1, wherein each image region of the set of image regions is a blob that corresponds to a group of connected pixels of the image data having substantially similar pixel values.

3. The computer-implemented method of claim 1, wherein the one or more image regions are selected further based at least partially on image region curvilinearity.

4. The computer-implemented method of claim 3, wherein the image region curvilinearity is determined based on a comparison of an image region size to an image region stroke width.

5. The computer-implemented method of claim 3, wherein selecting the one or more image regions includes:
   identifying an image region of the set of image regions satisfying a stability criterion; and
   determining whether the image region satisfies a curvilinear criterion.

6. The computer-implemented method of claim 5, wherein identifying the image region satisfying the stability criterion comprises selecting a most stable image region of the set of image regions based on a comparison of the one or more stability measures.

7. The computer-implemented method of claim 5, wherein selecting the one or more image regions further includes, after determining that the image region satisfies the curvilinear criterion, removing from the set of image regions all image regions that overlap the image region.

8. The computer-implemented method of claim 1, further comprising:
   determining a set of geometric figures that correspond to the one or more image regions; and
   determining a projection profile of the set of geometric figures.

9. The computer-implemented method of claim 1, wherein at least one image region of the set of image regions is selected for text extraction and wherein at least another image region of the set of image regions is not selected for text extraction.

10. The computer-implemented method of claim 1, wherein at least one image region of the set of image regions overlaps another image region of the set of image regions.

11. An apparatus comprising:
    an image region extractor configured to generate an indication of a set of image regions identified in image data; and
    a text image region selector configured to select one or more image regions from the set of image regions for text extraction, wherein the text image region selector is configured to determine one or more stability measures for the set of image regions, wherein at least one stability measure of the one or more stability measures corresponds to an amount of change of a size of a corresponding image region of the set of image regions, wherein the change of the size is responsive to a change in a threshold value, and wherein the text image region selector is configured to select the one or more image regions at least partially based on the one or more stability measures.

12. The apparatus of claim 11, wherein the text image region selector is further configured to select the one or more image regions at least partially based on image region curvilinearity.

13. The apparatus of claim 12, wherein the text image region selector includes:
    a selector configured to select a stable and curvilinear image region from the set of image regions; and
    an overlap region remover configured to remove image regions from the set of image regions that overlap the selected stable and curvilinear image region.

14. The apparatus of claim 11, further comprising an image region abstractor configured to determine a set of geometric figures that correspond to the selected one or more image regions.

15. The apparatus of claim 14, further comprising a text region detector configured to determine a projection profile of the set of geometric figures.

16. An apparatus comprising:
    means for identifying a set of image regions in image data; and
    means for selecting one or more image regions from the set of image regions for text extraction, wherein the means for selecting includes means for determining one or more stability measures for the set of image regions, wherein at least one stability measure of the one or more stability measures corresponds to an amount of change of a size of a corresponding image region of the set of image regions, wherein the change of the size is responsive to a change in a threshold value, and wherein the means for selecting is configured to select the one or more image regions at least partially based on the one or more stability measures.

17. The apparatus of claim 16, wherein the one or more image regions are selected further based at least partially on image region curvilinearity.

18. A non-transitory computer readable storage medium storing program instructions that are executable by a processor, the program instructions comprising:
    code for receiving an indication of a set of image regions identified in image data; and
    code for selecting one or more image regions from the set of image regions for text extraction, wherein the code for selecting one or more image regions includes code for determining one or more stability measures for the set of image regions, wherein at least one stability measure of the one or more stability measures corresponds to an amount of change of a size of a corresponding image region of the set of image regions wherein the change of the size is responsive to a change in a threshold value, and wherein the one or more regions are selected at least partially based on the one or more stability measures.

19. The computer readable storage medium of claim 18, wherein the program instructions further comprise code for selecting the one or more image regions further based at least partially on image region curvilinearity.

20. The computer-implemented method of claim 1, wherein the threshold value corresponds to a boundary of a region in an image color space.

* * * * *